US012519312B2

United States Patent
Pandey et al.

(10) Patent No.: US 12,519,312 B2
(45) Date of Patent: Jan. 6, 2026

(54) REPORTING AND MONITORING OF PERFORMANCE OF DISTRIBUTED ENERGY RESOURCES

(71) Applicant: COMMONWEALTH EDISON COMPANY, Chicago, IL (US)

(72) Inventors: Shikhar Pandey, Forest Park, IL (US); William I. Nation, Elmhurst, IL (US); Aleksandar Vukojevic, Harrisburg, NC (US); Esa A. Passo, Oakbrook Terrace, IL (US)

(73) Assignee: Commonwealth Edison Company, Chicago, IL (US)

( * ) Notice: Subject to any disclaimer, the term of this patent is extended or adjusted under 35 U.S.C. 154(b) by 525 days.

(21) Appl. No.: 17/837,796

(22) Filed: Jun. 10, 2022

(65) Prior Publication Data

US 2023/0335992 A1 Oct. 19, 2023

Related U.S. Application Data

(60) Provisional application No. 63/330,577, filed on Apr. 13, 2022.

(51) Int. Cl.
*H02J 3/14* (2006.01)
*G08B 21/18* (2006.01)

(52) U.S. Cl.
CPC ............ *H02J 3/144* (2020.01); *G08B 21/185* (2013.01)

(58) Field of Classification Search
CPC .............................. H02J 3/144; G08B 21/185
USPC .......................................................... 702/60
See application file for complete search history.

(56) References Cited

PUBLICATIONS

Hosseinzadeh et al., "A Real-Time Monitoring Platform for Distributed Energy Resources in a MicrogridaPilot Study in Oman", Published: Jul. 28, 2021 (Year: 2021).*

* cited by examiner

*Primary Examiner* — John H Le
(74) *Attorney, Agent, or Firm* — Ballard Spahr LLP

(57) ABSTRACT

Technologies are provided for reporting, monitoring, analyzing performance of distributed energy resources (DERs). The monitoring and analysis of a DER can be performed in real-time or essentially real-time. The monitoring also can include health monitoring of a DER. The reporting of performance of a DER is configurable. The monitoring and analysis of performance of the DER also is configurable. Attributes that control the reporting, monitoring, and analysis can be interactively configured via user interfaces having one multiple control elements. Performance of a DER can be reported, monitored, and analyzed irrespective of manufacturer of the DER.

23 Claims, 13 Drawing Sheets

Date/Time Input

510 —

| Start Date | Start Time (HH:MM:SS) |
|---|---|
| 548a ▼ | 548c |
| End Date | End Time (HH:MM:SS) |
| 548b ▼ | 548d |

310 —

◄ February 32 ►

| M | T | W | T | F | S | S |
|---|---|---|---|---|---|---|
|   |   |   |   |   |   | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | (22) — 314 |
| 23 | 24 | 25 | 26 | 27 | 28 | 29 |
| 1 |   |   |   |   |   |   |

FIG. 3

Select DER

220 — Select a DER
224 — Battery A ▼

410 — Sel | Battery A | Rate
Battery B
Battery C
Battery D
Battery E

FIG. 4A

Select DER

220 — Select a DER
224 — Battery A ▼

228 — Select Reporting Rate 10 m ▼

| Point Search Tool | | | | |
|---|---|---|---|---|
| Battery A | Battery B | Battery C | Battery D | Battery E |

Search for a Point — 510

| |
|---|
| 1474 – 12KV FA8216 MVA Feeder A8216 ApparentPower_3PH (MVA) |
| 1475 – 12KV FA8216 MVR Feeder A8216 ReactivePower_3PH (MVR) |
| 1476 – 12KV FA8216 MW Feeder A8216 Power_3PH (MW) |
| 1477 – 12KV FA8216 AMP_PHAFeeder A8216 Amps_PhaseA (Amps) |
| 1478 – 12KV FA8216 AMP_PHBFeeder A8216 Amps_PhaseB (Amps) |
| 1479 – 12KV FA8216 AMP_PHCFeeder A8216 Amps_PhaseC (Amps) |
| 1480 – 12KV C18 KVA Feeder C18 ApparentPower_3PH (KVA) |
| 1481 – 12KV C18 KVR Feeder C18 ReactivePower_3PH (KVR) |
| 1482 – 12KV C18 KW Feeder C18 Power_3PH (KW) |
| 1483 – 12KV C18 MVR_PHAFeeder C18 ReactivePower_PhaseA (MVR) |

FIG. 5

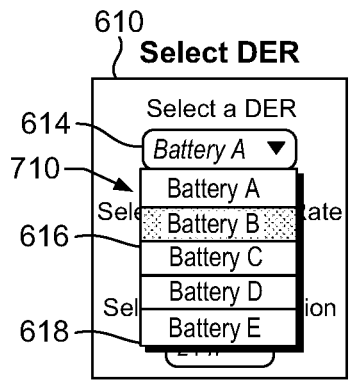
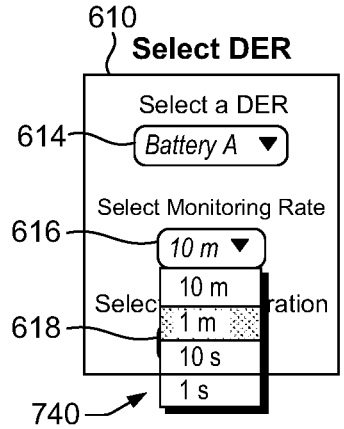
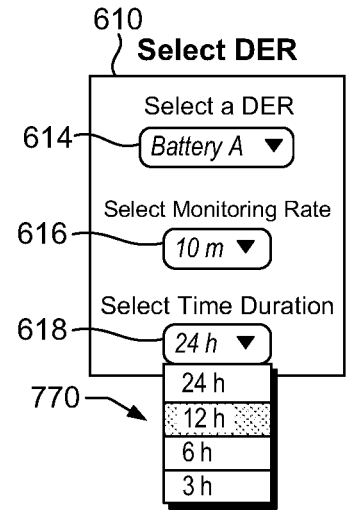
FIG. 7A  FIG. 7B  FIG. 7C
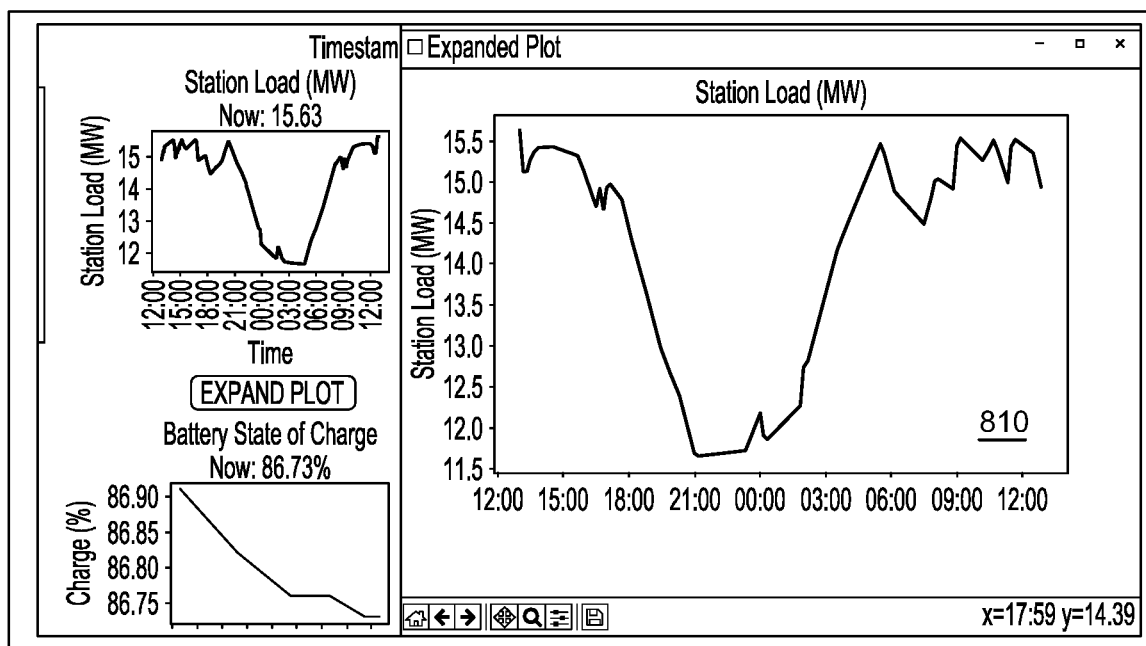
FIG. 8

REPORTING AND MONITORING OF PERFORMANCE OF DISTRIBUTED ENERGY RESOURCES

CROSS-REFERENCE TO RELATED APPLICATION

This application claims the benefit of and priority to U.S. Provisional Patent Application No. 63/330,577, filed Apr. 13, 2022, the contents of which application are hereby incorporated by reference herein in their entireties.

SUMMARY

It is to be understood that both the following general description and the following detailed description are illustrative and explanatory only and are not restrictive.

In one embodiment, the disclosure provides a computer-implemented method. The computer-implemented method includes causing presentation of a user interface (UI) during execution of a script at a computing device. The UI comprises multiple first control elements to configure respective attributes of monitoring data indicative of performance of a distributed energy resource (DER); and a first graph that conveys a temporal dependence of first data contained in the operational data, the first data identifying values of a metric that quantifies an operating state of the DER. The computer-implemented method also includes receiving, during the execution of the script, input data via at least a subset of the multiple first selectable UI elements; configuring, during the execution of the script, using the input data, a first attribute of the respective attributes, wherein the first attribute defines the DER; and updating the first graph based on real-time changes to the first data.

In another embodiment, the disclosure provides another computer-implemented method. The computer-implemented method includes causing presentation of a user interface (UI) during execution of a script at a computing device. The UI comprises multiple first control elements to configure respective attributes of recordation of data indicative of performance of a DER; and a second control element to direct generation of a report file containing a portion of the data indicative of the performance of the DER. The computer-implemented method also includes receiving, during the execution of the script, input data via a subset of the multiple first control elements; and configuring, during the execution of the script, using the input data, multiple attributes of the respective attributes, the multiple attributes defining a reporting period. The computer-implemented method further includes receiving, during the execution of the script, an interrupt signal indicative of selection of the second control element; and generating, using the reporting period, the report file comprising the portion of the data indicative of the performance of the DER.

In yet another embodiment, the disclosure provides another computer-implemented method. The computer-implemented method includes causing presentation of a user interface (UI) during execution of a script at a computing device. The UI comprises a control element to configure a distributed energy resource (DER) for monitoring operational status; and a first graph that conveys a temporal dependence of first data defining values of a metric indicative of operating state of the DER. The computer-implemented method further comprises receiving, during the execution of the script, input data via the control element, the first data identifying the DER; and updating the first graph based on real-time changes to the first data.

Additional elements or advantages of this disclosure will be set forth in part in the description which follows, and in part will be apparent from the description, or may be learned by practice of the subject disclosure. The advantages of the subject disclosure can be attained by means of the elements and combinations particularly pointed out in the appended claims.

This summary is not intended to identify critical or essential features of the disclosure, but merely to summarize certain features and variations thereof. Other details and features will be described in the sections that follow. Further, both the foregoing general description and the following detailed description are illustrative and explanatory only and are not restrictive of the embodiments of this disclosure.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, serve to explain at least in part various principles, elements, or aspects of the disclosure. Embodiments of the disclosure are described more fully below with reference to the annexed drawings. However, various elements of the disclosure can be implemented in many different forms and should not be construed as limited to the implementations set forth herein. Like numbers refer to like elements throughout.

FIG. 3 illustrates an example of a configuration element, in accordance with one or more embodiments of this disclosure.

FIG. 4A illustrates an example of another configuration element, in accordance with one or more embodiments of this disclosure.

FIG. 4B illustrates an example of yet another configuration element, in accordance with one or more embodiments of this disclosure.

FIG. 5 illustrates an example of a user interface that permits configuring source points (or targets) for recordation in a custom report, in accordance with one or more embodiments of this disclosure.

FIG. 7A illustrates an example of another configuration element, in accordance with one or more embodiments of this disclosure.

FIG. 7B illustrates an example of yet another configuration element, in accordance with one or more embodiments of this disclosure.

FIG. 7C illustrates an example of still another configuration element, in accordance with one or more embodiments of this disclosure.

FIG. 8 illustrates an example of graphs that can be presented in a monitoring user interface, in accordance with one or more embodiments of this disclosure.

DETAILED DESCRIPTION

Figure 1:
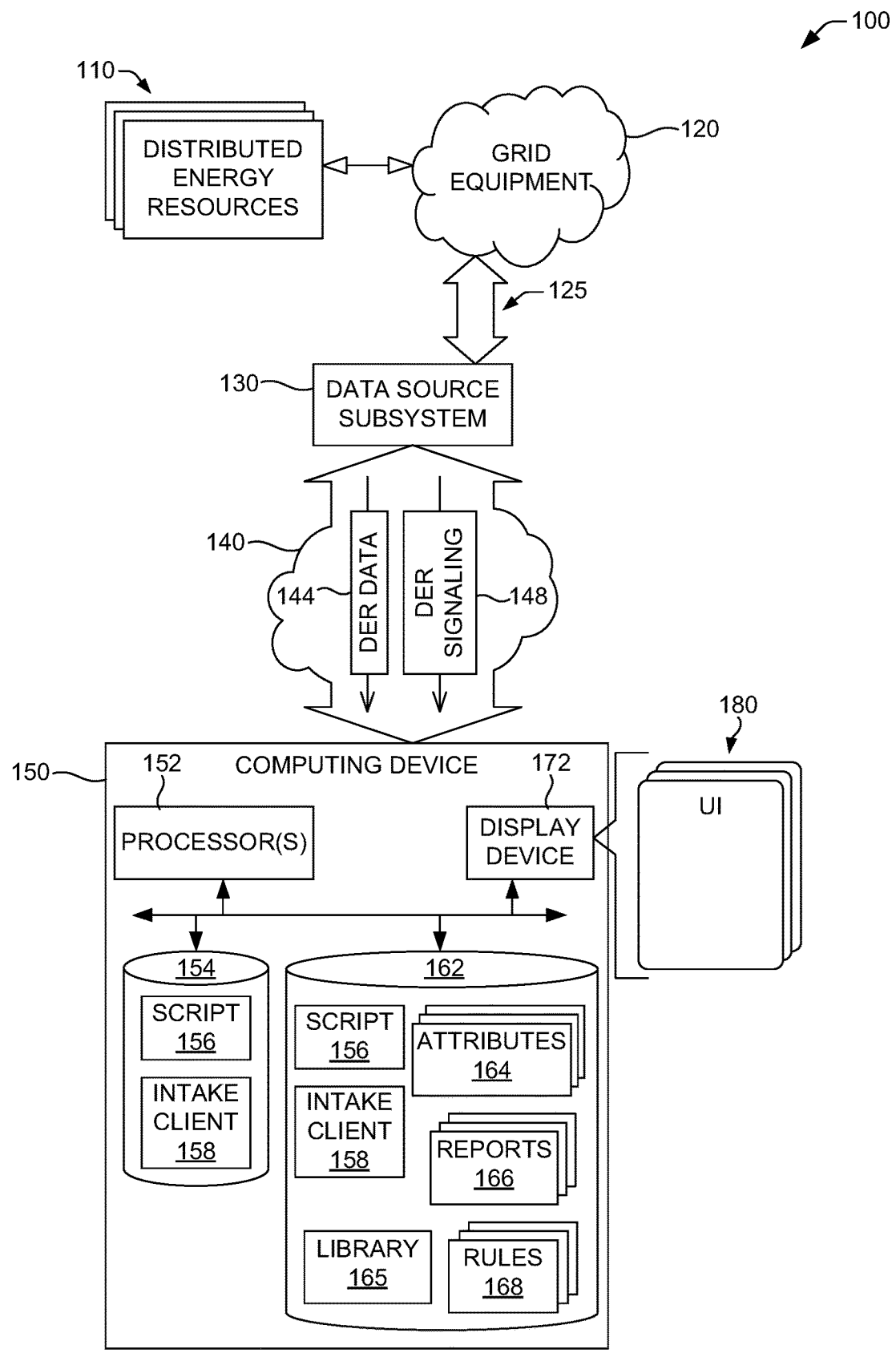
FIG. 1 illustrates an example of an operating environment for the reporting and monitoring of DER performance, in accordance with one or more embodiments of this disclosure.

The disclosure recognizes and addresses, among other technical challenges, the issues of accessing and analyzing data and/or signaling from distributed energy resources (DER) within a territory of a utility. Those issues are exacerbated when heterogeneous groups of DERs, including assets from different manufacturers, are contemplated and real-time time analysis is desired. Embodiments of this disclosure, individually or in combination, can permit reporting, monitoring, and analyzing performance of DERs. The monitoring and analysis of a DER can performed in real-time or essentially real-time. The monitoring also can include health monitoring of a DER. The reporting of performance of a DER is configurable, providing rich, comprehensive reports that include various characteristics of the performance of the DER. The monitoring and analysis of performance of the DER also is configurable. Attributes of the reporting, monitoring, and analysis can be interactively configured. In some embodiments, a computing device can execute a script to report, monitor, and analyze performance of the DERs. Execution of the script can cause presentation, at different times, of multiple user interfaces (UIs). The UIs include a reporting UI and a monitoring UI. The reporting UI includes control elements to configure reporting attributes that control the manner of generating a report and the type of content included in the report. The monitoring UI includes at least one control element to configure monitoring attributes that control, for example, the type and amount of DER data being monitored.

Embodiments of this disclosure provide a real-time dashboard for monitoring performance of a DER selected among a group of DERs. In addition, or in other embodiments, the analysis of the performance can include generating estimate of a duration of support that DER, such as a battery, can provide. Further, or in yet other embodiments, corrupt and/or missing data can be detected. In response to such detection, estimates of satisfactory data can be provided to replace the corrupt and/or missing data.

Embodiments of this disclosure permit reporting, monitoring, and analyzing performance of DERs irrespective of manufacturer. As a result, a utility can use embodiments of this disclosure to benchmark different DER manufacturers based on comparative study of different assets, for example. Additionally, performance of utility scale DERs, such as batteries and photovoltaics, can be readily monitored and analyzed. Such manufacturer-agnostic functionalities provide superior assessment capabilities relative to existing technologies.

Further, the flexibility with which the DER data can be reported, monitored, and analyzed yields a wealth of DER performance information that can be utilized by utility operators to plan for outage repairs, for example. As a result, the efficiency of energy supply can be superior to that of existing technologies.

Embodiments of the disclosure also are scalable in that after DER data for a DER becomes accessible to a utility operator, that DER can be readily added for monitoring and reporting. Additionally, the utility operator can define source points (or targets) that can be monitored for a particular DER. Data points such as state of charge (SOC), energy output, and other relevant data points can be defined for real-time or nearly real-time monitoring and/or performance study. Some data points can be used for asset health monitoring and/or advanced analytics.

With reference to the drawings, FIG. 1 illustrates an example of an operating environment 100 for the monitoring of DER status and generation of a reports of such status, in accordance with one or more embodiments of this technology. The operating environment 100 includes multiple distributed energy resources 110 (DERs 110) that can be distributed geographically within a particular region. For purposed of illustrations, DERs refer to various types of electricity generation and energy storage equipment that are dispersed and connected to an electricity distribution network (or power grid). DERs are typically associated with distributed generation. Distributed generation (also known as embedded or local generation) refers to generation of electricity from equipment, often renewable energy equipment, near a point of use instead of centralized generation equipment from power plants.

The DERs 110 can include, for example, small and dispersed power generation equipment; energy storage equipment (such as batteries); electric vehicles (EVs) used to export power back to the power grid; photovoltaic units; combined heat and power (CHP) equipment; tri-generation equipment that utilize waste heat to provide cooling; micro-grids; wind turbines; biomass generators, which are fueled with waste gas or industrial and agricultural byproducts; gas turbines; reciprocating engines; fuel cells; hydro and mini-hydro schemes; and similar equipment.

The DERs 110 are functionally connected to grid equipment 120. The grid equipment 120 embodies an electricity distribution network (or power grid). In some configurations, the DERs 110 are functionally connected to the grid equipment 120 in a one-to-one arrangement, where each DER of the DERs 110 is connected to the grid equipment 120 at a respective location. In other configurations, the DERs 110 are functionally connected to the grid equipment 120 in a many-to-one arrangement, where subsets of two or more DERs are functionally connected to the grid equipment 120 at respective locations. In other words, multiple first DERs of the DERs 110 can be functionally coupled to the grid equipment 120 at a first location, and multiple second DERs can be functionally coupled to the grid equipment 120 at a second location. Mixed configurations also are contemplated, where at least one DER of the DERs 110 can be functionally connected to the grid equipment 120 in a one-to-one configuration, and multiple second DERs of the DERs 110 can be functionally connected to the grid equipment 120 in a many-to-one arrangement.

Regardless of the configuration(s) used to functionally connect the DERs 110 to the grid equipment 120, the operating environment also includes a data source subsystem 130 functionally coupled to the grid equipment 120 via a communication architecture 125. The data source subsystem 130 includes one or multiple server devices that can obtain DER data 144 or DER signaling 148, or both, corresponding to the DERs 110. The DER data 144 can identify operating performance of one or multiple source points (or targets), and the DER signaling 148 can identify operating status of the source point(s). For purposes of illustration, a source point (or target) refers to a tag or metadata attribute that identifies a component of a DER in the DERs 110. That component, in turn, embodies a source of DER data. Accordingly, a source point also can be referred to as a data source.

The data source subsystem 130 can send DER data 144 or DER signaling 148, or both, to a computing device 150 via one or multiple networks 140 (e.g., wireless network(s), wireline network(s), or a combination of both). To that end, the server device(s) included in the data source subsystem 130 can provide, individually or in combination, a service that supplies data and/or signaling. The computing device 150 can execute an intake client 158 that subscribes to that service. As a result, the intake client 158 can receive the DER data 144 or the DER signaling 148, or both. To execute the intake client 158, the computing device 150 includes one or more processors 152. Each one of the processor(s) 152 can have at least one processing core. The processor(s) 152 can be assembled in a single chipset or can be distributed over many computing chipsets. The processor(s) 152 can constitute a central processing unit (CPU). In other cases, the processor(s) 152 can constitute a graphical processing unit (GPU) or a tensor processing unit (TPU). In yet other cases, the processor(s) 152 can constitute a combination of CPU(s), GPU(s), and/or TPU(s). Further, the computing device 150 also includes a bus architecture (represented by arrows within the computing device 150) that can mutually functionally couple the processor(s) 152, one or multiple memory devices 154, and one or multiple non-volatile memory devices 162. The memory device(s) 154 can include, for example, a combination of volatile memory device(s) and non-volatile memory device(s). The memory device(s) 154 can be referred to as system memory 154. The non-volatile memory device(s) 162 can be referred to as mass storage 162. To execute the intake client 158, in some cases, the processor(s) 152 can load the intake client 158 onto the system memory 154 and can execute the processor-executable components that form the intake client 158.

The computing device 150 can execute a script 156 to monitor DER performance and generate a report of such status. The computing device 150 includes one or more processors 152 that can execute the script 156. In some cases, the computing device 150 can execute the script 156 via an interpreter program (not depicted) executed by the one or more processors 152 that can load instructions, individually or in blocks, for example, that form the script 156 onto the system memory 154. The processor(s) 152 execute the loaded instructions (represented, for the sake of clarity, by a block labeled "script 156" within system memory 154. The script 156 may not have dependencies. Simply as an illustration, the script 156 can be a Python script, a Perl script, a Lua script, or another type of script in accordance with another interpreted language. Generating the report can include storing the report in the one or multiple non-volatile memory devices 162 (referred to as non-volatile memory 162). To store the report, in some embodiments, the computing device 150 can generate a file containing a particular view of the DER data 144 in a filesystem within the non-volatile storage device 162. The file can be formatted according to one of several formats accessible by data processing software, spreadsheet composition software, or similar software.

More specifically, as a result of executing the script 156, the computing device 150 can cause the display device 172 to present one or more user interfaces of multiple user interfaces 180 to monitor DER performance or generate reports of the DER performance. At least one of the user interfaces 180 can include selectable UI elements that permit configuring the manner of reporting some or all of the DER data 144 and/or DER signaling 148. Additionally, at least one of the user interfaces 180 can include selectable UI elements that permit controlling the manner of analyzing some or all of the DER data 144 and/or DER signaling 148. Further, at least one of the user interfaces 180 can include selectable UI elements that permit controlling an amount of data indicative of operational health of a DER. Such data can be referred to as health data and can be contained within the DER data 144 and/or DER signaling 148.

Accordingly, one or more user interfaces of the user interfaces 180 include control elements that can be presented according to a defined layout of digital content. The defined layout can be specific to the user interface that is presented. Formatting information (not depicted in FIG. 1) corresponding to that user interface can define the layout. As an illustration, the layout of the user interface can include multiple areas containing respective groups of control elements that can control how DER data 144 or DER signaling 148, or both, can be reported or monitored. More specifically, in some configurations, each area represents an aspect of reporting of DER data 144. Thus, selection of a particular control element within an area can cause the computing device 140 to configure an attribute of the reporting of some or all of the DER data 144 available to the computing device 150. Such an attribute can define an element of a report containing at least a subset of the DER data 144.

The computing device 150 can present each one of the multiple user interfaces 180 by means of a display device 172. To that end, execution of the script 156, via the processor(s) 152, can cause an I/O controller device (not depicted in FIG. 1) to direct the display device 172 to present a particular user interface. The display device 172 can be part of a display unit. In some embodiments, the display unit can include a liquid crystal display (LCD) or a light-emitting diode (LED) display. Such a display can be either backlit or frontlit. The display unit also can include an output interface module that can control the operation of the LCD or the LED display and associated lighting circuitry in order to present user interfaces.

In some cases, the display unit can include an input module, such as a touch-screen device, that can be functionally coupled with the I/O controller device and can receive input data via touch (e.g., taps, swipes, pinch-and-zoom, and/or other gestures). Thus, in some embodiments, the computing device 150 can receive input data and/or signaling via the display device 172. The input data can define one or multiple attributes of reporting DER performance and/or one or multiple attributes of monitoring DER performance.

Figure 2:
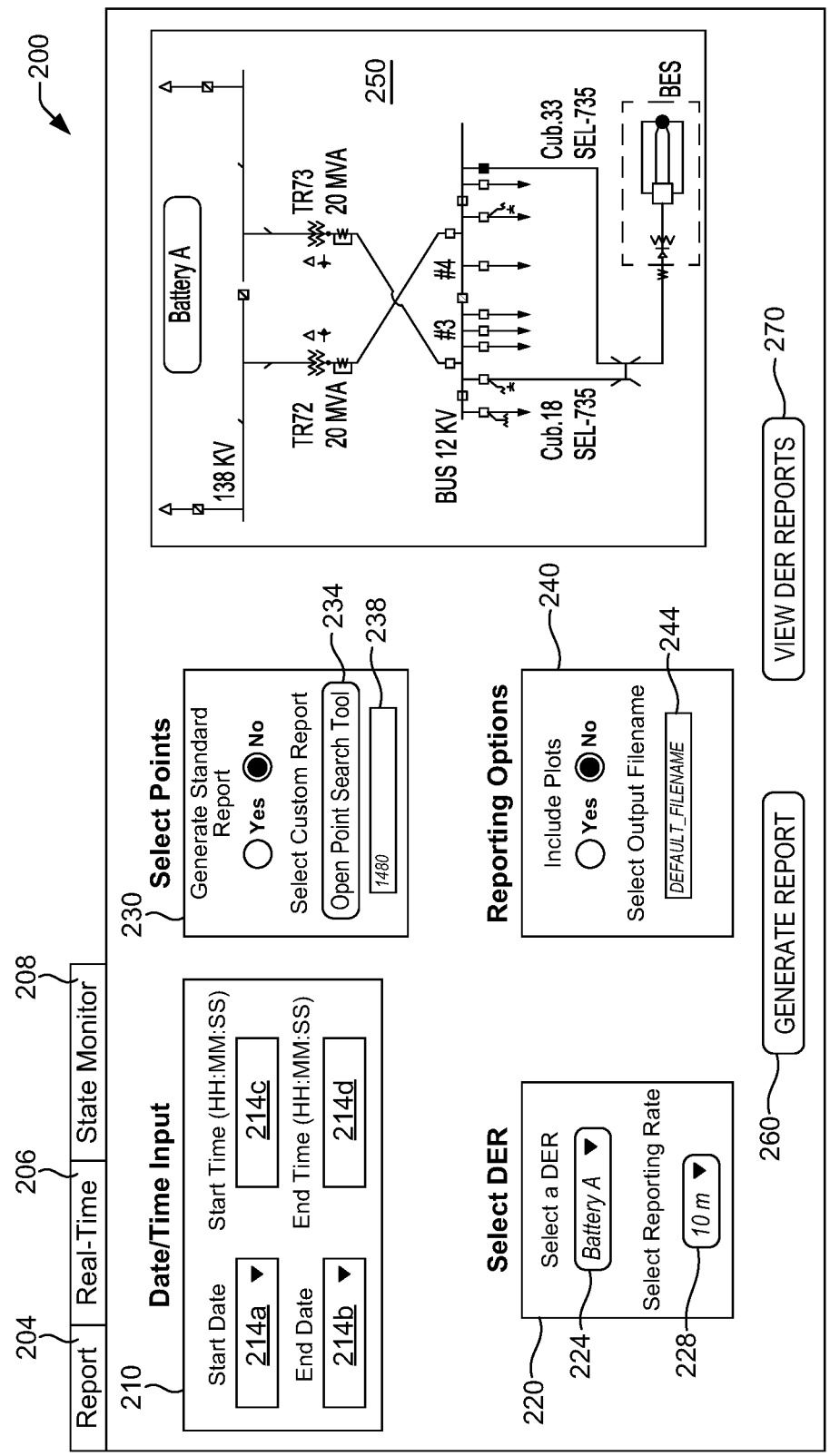
FIG. 2 illustrates an example of a user interface that permits configuring the manner of reporting DER data and/or DER signaling, in accordance with one or more embodiments of this disclosure.

FIG. 2 illustrates an example of a configuration user interface 200 (configuration UI 200) that permits configuring the manner of reporting DER data and/or DER signaling, in accordance with one or more embodiments of this disclosure. The configuration UI 200 includes multiple selectable tabs that in response to being individually selected, cause the computing device 150 to direct the display device 172 to present a respective UI associated with monitoring DER data. As is illustrated in FIG. 2, the configuration UI 200 includes a first selectable tab 204 that in response to being selected, causes the computing device 150 to direct the display device 172 to redraw the configuration UI 200. The first selectable tab 204 is labeled "Report" simply for the sake of nomenclature. The configuration UI 200 also includes a second selectable tab 206 that in response to being selected, causes the computing device 150 to direct the display device 172 to present a UI that permits monitoring at least a portion of the DER data 144 as such data becomes available. The second selectable tab 206 is labeled "Real-Time" simply for the sake of nomenclature. Additionally, the configuration UI 200 also includes a third selectable tab 208 that in response to being selected, causes the computing device 150 to direct the display device 172 to present a UI that permits monitoring at least a portion of the DER data 144 and at least a portion of the DER signaling 148, as such data and signaling become available. The third selectable tab 208 is labeled "State Monitor" simply for the sake of nomenclature.

The configuration UI 200 includes a layout of multiple areas. A subgroup of the multiple areas includes a first area 210 having multiple control elements that permit configuring a reporting time interval during which the computing device 150 can generate a report component containing a data view of the DER data 144 (FIG. 1). The report component can be embodied in, for example, a file, a container, a database, a table in a database, or similar component. The reporting time interval defines the span of time for analysis of DER status. The reporting time interval can be defined in terms of (i) a start date and start time and (ii) an end date and end time. As such, the first area 210 includes a first control element 214a and a second control element 214b that can receive, respectively, first input data and second input data. The first input data define the start date of the reporting time interval, and the second input data define the end date of the reporting time interval. In some embodiments, the start date and the end data can both be configured as the current date, as a preset (or default) configuration prior to receiving the first and/or second input data. The first input data and the second input data can be received via a peripheral device functionally coupled to the computing device 150 and/or via the display device 172.

In some cases, rather than receiving first and second input data that expressly define the start date and the end data, respectively, each one of the first control element 214a and the second control element 214b can include a selectable indicium (represented by a solid triangle in FIG. 2) that permits accessing another control element to supply the first and second input data. Selection of the selectable indicium causes the computing device 150, via the script 156, to direct the display device 172 to present a configuration element 310 as is shown in FIG. 3. The configuration element 310 is presented as an overlay onto the user interface 200 (FIG. 2). The overlay can be adjacent to the selectable indicium, in some cases.

The configuration element 310 presents a calendar view (e.g., a month view or a week view) including days that can be configured as either a start date or an end date. Each day shown in the calendar view can be selectable and includes text, or other markings, identifying the day. Selection of a day in the calendar view can cause the computing device 150, via the script 156, to fill the first control element 214a or the second control element 214b. Such a selection also can cause the computing device 150, via the script 156, to create an attribute identifying the start date or the end date. That attribute can be retained in one or multiple memory elements 164 (referred to as attributes 164; FIG. 1) within non-volatile memory 162. A circle 314 represents selection of a particular start date or end date in the configuration element 310.

Further, the first area 210 includes a third control element 214c and a fourth control element 214d that can receive, respectively, third input data and fourth input data. The third input data defines a start time of the reporting time interval, and the fourth input data defines the end time of the reporting time interval.

After the reporting time interval has been configured, the computing device 150 can execute, or can continue executing, the script 156 to determine if the reporting time interval is valid. In response to a determination that the reporting time interval is invalid the computing device 150 can cause the display device 172 to present a prompt (not depicted in FIG. 2) to reconfigure the reporting time interval. The reporting time interval is invalid in cases where the reporting time interval is in the future, when data 144 and/or signal 148 would not be available. A start date/time after end date/time also results in an invalid time interval.

The layout of multiple areas in the configuration UI 200 also includes a second area 220. The second area 220 includes a first control element 224 that permits selecting a particular DER for which DER data is to be reported. The first control element 224 is embodied in a box having a curved corners and includes a selectable indicium (represented by a triangle in FIG. 2). The first control element 224 further includes text ("Battery A," simply as an example) identifying a selected DER (either a prior selected DER or a currently selected DER). As is illustrated in FIG. 4A, selection of the selectable indicium contained in the first control element 224 can cause the computing device 150, via the script 156, to direct the display device 172 to present a configuration element 410. The configuration element 410 is embodied in a menu of DERs, each of which DERs can be monitored. The DERs identified in the menu can be part of the distributed energy resources 110 (FIG. 1), for example. Each item in the menu of DERs is selectable and includes text, or other markings, identifying a particular DER. Selection of an item of the menu of DERs can cause the computing device 150, via the script 156, to redraw the menu of DERs with the item highlighted or otherwise marked. For instance, the item corresponding to "Battery B" is selected and represented by a stippled block in FIG. 4A.

The second area 220 also includes a second control element 228 that permits configuring a rate of recordation of DER data in a report component (e.g., a file, a container, a database, or similar component). The rate of recordation is a time interval between successive data being recorded in a report component (e.g., a file or table in a database). Such rate also can be referred to as a "reporting resolution." The second control element 228 is embodied in a box having curved corners and includes a selectable indicium (represented by a triangle in FIG. 2). The second control element 228 further includes text ("10 m," simply as an example) identifying a selected period Δt (either a prior selected period Δt or a currently selected period Δt).

Selection of the selectable indicium contained in the second control element 228 can cause the computing device 150, via the script 156, to direct the display device 172 to present a configuration element 460 as is illustrated in FIG. 4B. The configuration element 460 can be embodied in a menu of periodicities that define respective reporting resolutions. Each item in the menu of periodicities is selectable and includes text, or other markings, identifying a particular period Δt. Selection of an item of the menu of periodicities can cause the computing device 150, via the script 156, to redraw the menu of periodicities with the selected item highlighted or otherwise marked. For instance, item corresponding to "1 m" (Δt=60 s) is selected and represented by a stippled block in FIG. 4B.

The layout of multiple areas in the configuration UI 200 (FIG. 2) further includes a third area 230. The third area 230 includes control elements that permit configuring one or more datasets of the DER data 144 for recordation within a report component. The dataset(s) can correspond to respective source points. Specifically, in an example scenario where multiple datasets are part of the DER data 144, a first dataset of the multiple datasets corresponds to a first source point in a particular DER, and a second dataset of the multiple datasets corresponds to a second source point in the particular DER.

The control elements within the third area 230 include selectable indicia (embodied in selectable buttons, for example) that, in response to being individually selected, permit specifying whether or not a preset type of report component is to be generated. The preset type of report component can be referred to as a standard report component. The standard report component can include one or multiple spreadsheets. In addition, or in some cases, the standard report can include graphs of respective datasets in a separate sheet. Further or in other cases, the standard report can be embodied in a flat file (such as comma-separated values (CSV) file). The standard report component can be formatted according to one of various formats accessible to spreadsheet software or other types of software applications for data processing. Selection of a first indicium (e.g., "Yes" selectable button) of the selectable indicia can cause the computing device 150 (FIG. 1) to generate, via the script 156, a flag (or another type of reporting attribute) that directs the computing device 150 to generate the standard report component. The computing device 150 can retain such flag in the attributes 164 within non-volatile memory 162 (FIG. 1). Selection of a second indicium (e.g., "No" selectable button) of the selectable indicia can cause the computing device 150 (FIG. 1), via the script 156, to generate a flag (or another type of reporting attribute) that directs the computing device 150 to generate a custom report components instead of the standard report component. The computing device 150 can retain such a flag in the attributes 164 within non-volatile memory 162 (FIG. 1).

The control elements within the third area 230 also include a selectable visual element 234 that permits configuring one or multiple source points for inclusion in the custom report component. Each one of the source point(s) yields a respective dataset within the custom report component. Each one of the source point(s) pertains to the particular DER selected using the first control element 224. In one example, the particular DER is Battery A. Selection of the selectable visual element 234 can cause the computing device 150, via the script 156, to direct the display device 172 to present a user interface embodying a point search tool. The point search tool can present a menu of source points corresponding to the particular DER (e.g., Battery A). Each item in the menu of source points is selectable. A single source point can be selected for recordation, or multiple source points in the menu also can be concurrently selected for recordation. Selection of a particular source points in the menu of source points causes the computing device 150, via the script 156, to direct the display device 172 to redraw the menu with the item corresponding the particular source point being highlighted. Source points identified in the point search tool can be listed in a fillable field 238 in the third area 230 (FIG. 2) to convey that the custom report includes data corresponding to that particular source point.

The UI 500 shown in FIG. 5 is an example of the point search tool. While not depicted in FIG. 2, in response to selection of the selectable visual element 234, the UI 500 can be presented as an overlay onto a section of the UI 200. Simply as an illustration, source point 1480 is shown as being selected, with the corresponding menu item being highlighted as a stippled block. Further, the text "1480" is shown in the fillable field 238 to convey that the custom report includes data corresponding to the source point 1480.

The UI 500 also includes a selectable visual element 510 that permits searching for a source point. To that end, the selectable visual element 510 can receive text defining a query. The query can define one or multiple words that can identify one or multiple query criteria. The computing device 150, via the script 156 or another component, can resolve the query and can redraw the UI 500 to presents results responsive to the query. The results can be presented as an updated menu of source points that satisfy the query. The query can be resolved using source-point titles retained within the non-volatile memory 162. For example, the source-point titles can be retained in a user-defined file (not depicted in FIG. 1). The file can be a CSV file or another type of file. Further, in some embodiments, rather than composing and resolving a query, selection of the selectable visual element 510 can cause the script 156 of that other component to obtain the source-point titles retained in a user-defined file, and cause presentation of those titles in the UI 500.

With further reference to FIG. 2, the fillable field 238 also can receive input data defining one or multiple source points for recordation in the custom report. The input data can be received via a peripheral device functionally coupled to the computing device 150 and/or via the display device 172.

The layout of multiple areas in the configuration UI 200 further includes a fourth area 240. The fourth area 240 includes control elements that permit configuring reporting options. The control elements include selectable indicia that, in response to being individually selected, permit specifying presence or absence of a plot within a report component. The selectable indicia can be embodied in selectable buttons, for example. Selection of a first indicium (e.g., "Yes" selectable button) of the selectable indicia can cause the computing device 150 (FIG. 1), via the script 156, to generate a flag (or another type of reporting attribute) indicative of presence of one or more plots in the report component. The computing device 150 can retain such flag in the attributes 164 within non-volatile memory 162 (FIG. 1). Selection of a second indicium (e.g., "No" selectable button) of the selectable indicia can cause the computing device 150 (FIG. 1), via the script 156, to generate a flag (or another type of reporting attribute) indicative of absence of one or more plots in the report component. The computing device 150 can retain such flag in the attributes 164 within non-volatile memory 162 (FIG. 1). In some embodiments, the second indicium can be selected as a preset configuration. Each one of the plot(s) corresponds to the respective source points (or data sources) identifying datasets within the DER data 144.

The control elements also include a fillable field 244 that can receive input information configuring a name for the report component. In cases the report component is embodied in a file, the name defines the filename of that file. The fillable field 244 can contain a default name, shown as "Default Filename," simply as an example.

The layout of multiple areas in the configuration UI 200 still further includes a fifth area 250. The fifth area 250 can include a visual representation of the DER that has been selected via the control element 224. That is, selection of the DER (e.g., Battery A) can cause presentation of the visual representation within the fifth area 250. As is shown in FIG. 2, the visual representation can be embodied in a one-line diagram of the selected DER. Other visual representations can be presented, such as a map of location of the selected DER, a picture of the DER asset, or similar imagery. In cases where a video feed of the DER asset is available, the computing device 150 can obtain the video feed and can present some or all of the images frames received in the video feed within the fifth area 250. The computing device 150 can receive the video feed via the intake client 158, for example.

The UI 200 also includes a selectable visual element 260 that controls generation of a report component according to reporting attributes configured via the area 210, area 220, area 230, and area 240. Selection of the selectable visual element 260 causes the computing device 150 to generate the report component (e.g., a report file), and further causes the computing device to retain the report component in one or multiple memory elements 166 (referred to as reports 166) within non-volatile memory 162. In addition, or in some embodiments, selection of the selectable visual element 260 causes the computing device 150 to execute particular software to present one or multiple spreadsheets containing data present in the report component. The particular software can be embodied in, for example, one of data processing software or spreadsheet composition software. Although not shown, the particular software can be retained in non-volatile memory 162 (FIG. 1).

The UI 200 further includes a selectable visual element 270 that controls access to extant report components. Selection of the selectable visual element 270 can cause the computing device 150, via the script 156, to direct the display device 172 to present a filesystem directory that contains extant files, each embodying a report component. Although not shown, the filesystem directory can be retained in non-volatile memory 162 (FIG. 1).

Figure 6:
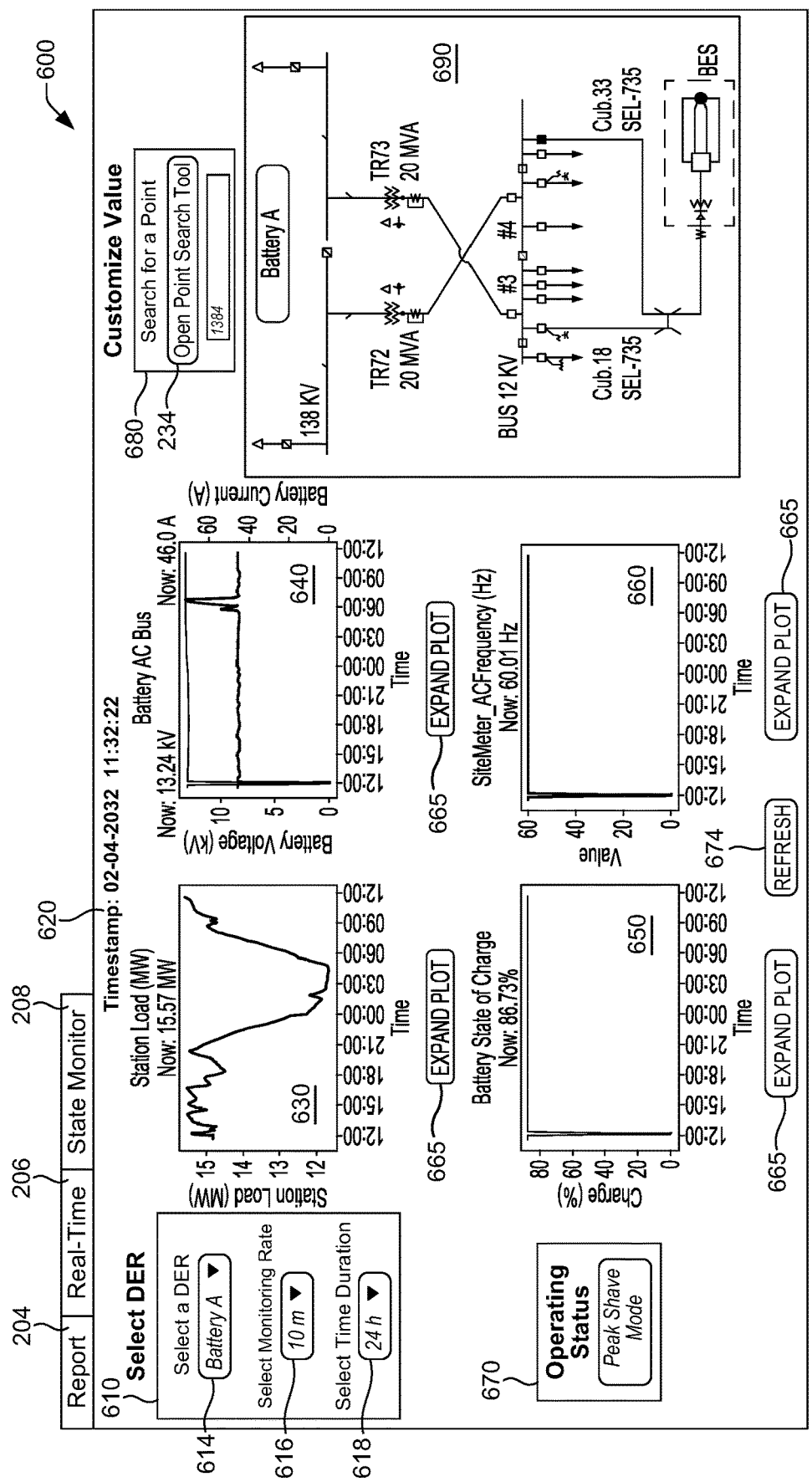
FIG. 6 illustrates an example of a user interface that permits monitoring DER data, in accordance with one or more embodiments of this disclosure.

FIG. 6 illustrates an example of a monitoring user interface 600 (monitoring UI 600) that permits monitoring DER data 144 (FIG. 1), in accordance with one or more embodiments of this disclosure. As mentioned, the computing device 150, via the script 156, can cause the display device 172 to present the monitoring UI 600 in response to selection of the second selectable tab 206. The monitoring UI 600 includes the first selectable tab 204, the second selectable tab 206, and the third selectable tab 208.

The monitoring UI 600 permits monitoring the DER data 144 (FIG. 1) as the data becomes available (e.g., in real-time or in nearly real-time) or at a defined monitoring rate. The monitoring UI 600 includes a layout of multiple areas. A subgroup of the multiple areas includes a first area 610 having control elements that permit selecting a particular DER to be monitored and time attributes of the monitoring. The time attributes can include a rate at which the data is monitored and a monitoring time interval. Such a rate can define the resolution of the DER data to be received, at the computing device 150, via the script 156, from a historian within the data source subsystem 130. The received DER data correspond to one or multiple source points. The monitoring time interval defines the duration of the monitoring.

More specifically, the first area 610 includes a first control element 614 that permits selecting the particular DER to be monitored. The first control element 614 is embodied in a box having curved corners and includes a selectable indicium (represented by a triangle in FIG. 6). The first control element 614 further includes text ("Battery A," simply as an example) identifying a selected DER (either a prior selected DER or a currently selected DER). As is illustrated in FIG. 7A, selection of the selectable indicium contained in the first control element 614 can cause the computing device 150, via the script 156, to direct the display device 172 to present a configuration element 710 embodied in a menu of DERs that can be monitored. The DERs identified in the menu can be part of the distributed energy resources 110 (FIG. 1), for example. In some cases, the DERs identified in the menu can be the same as those identified in the configuration element 410 (FIG. 4). Each item in the menu of DERs is selectable and includes text, or other markings, identifying a particular DER. Selection of an item of the menu of DERs can cause the computing device 150, via the script 156, to redraw the menu of DERs with the item highlighted or otherwise marked. For instance, item corresponding to "Battery B" is selected and represented by a stippled block in FIG. 7A.

The first area 610 also includes a second control element 616 that permits configuring a rate of presentation of DER data in graphs that can be included in the monitoring UI 600. Such rate can be referred to as monitoring rate or "monitoring resolution." The second control element 616 is embodied in a box having curved corners and includes a selectable indicium (represented by a triangle). The second control element 616 further includes text ("10 m," simply as an example) identifying a selected period Δt (either a prior selected period Δt or a currently selected period Δt). As is illustrated in FIG. 7B, selection of the selectable indicium contained in the second control element 616 can cause the computing device 150, via the script 156, to direct the display device 172 to present a configuration element 740. The configuration element 740 can be embodied in a menu of periodicities that define respective monitoring resolutions. Each item in the menu of periodicities is selectable and includes text, or other markings, identifying a particular period Δt. Selection of an item of the menu of periodicities can cause the computing device 150, via the script 156, to redraw the menu of periodicities with the selected item highlighted or otherwise marked. For instance, item corresponding to "1 m" (Δt=60 s) is selected and represented by a stippled block in FIG. 7B.

The first area 610 further includes a third control element 618 that permits configuring the monitoring time interval. The third control element 618 is embodied in a box having curved corners and includes a selectable indicium (represented by a triangle). The third control element 618 further includes text ("24 h," simply as an example) identifying a selected monitoring interval (either a prior selected monitoring interval or a currently selected monitoring interval). As is illustrated in FIG. 7C, selection of the selectable indicium contained in the third control element 618 can cause the computing device 150, via the script 156, to direct the display device 172 to present a configuration element 770. The configuration element 770 can be embodied in a menu of time intervals that define respective monitoring durations. Each item in the menu of time intervals is selectable and includes text, or other markings, identifying a particular monitoring duration. Selection of an item of the menu of time intervals can cause the computing device 150, via the script 156, to redraw the menu of time intervals with the selected item highlighted or otherwise marked. For instance, item corresponding to "12 h" (monitoring duration of 12 hours) is selected and represented by a stippled block in FIG. 7C.

The monitoring UI 600 also includes multiple graphs that can be arranged, for example, in a middle section of the monitoring UI 600. The multiple graphs include a first graph 630, a second graph 640, a third graph 650, and a fourth graph 660. Each one of the multiple graphs presents a time series of DER data identifying values of a metric that quantifies an operating state of the DER. That metric can correspond to a particular source point pertaining to the DER. The metrics corresponding to the multiple graphs can be preset or can be configurable. Data defining present metrics can be retained in the attributes 164 (FIG. 1) and/or another memory element within non-volatile memory 162 (FIG. 1).

Such DER data can be embodied in a portion of DER data 144 (FIG. 1). As an illustration, station load as a function of time is shown in graph 630, and site AC frequency as a function of time is shown in graph 660. In some embodiments, the DER is embodied in a battery. Thus, in one example, battery AC bus as a function of time is shown in graph 640 and battery state of charge as a function of time is shown in graph 650.

The monitoring UI 600 further includes indicia 620 identifying a timestamp of the creation of the multiple graphs, and a control element 674 embodied in a selectable visual element labeled "Refresh," simply for the sake of nomenclature. Selection of the control element 674 causes the computing device 150, via the script 156, to redraw the monitoring UI 600, presenting updated data within the multiple graphs. By updating the multiple graphs concurrently, a rich, comprehensive view of operating state of the DER is made available. The updated data is current DER data, available at substantially the time of selecting the control element 674 regardless of a current monitoring rate. To that, selection of the control element 674 causes the computing device 150, via the script 156, to poll the data source subsystem 130 for DER data. An updated datum corresponding to the metric presented in a graph of the multiple graphs can be conveyed using text including the characters "Now:"

Further, in some embodiments, the monitoring UI 600 can include a control element 665 for each graph of the multiple graphs. The control element 665 can be embodied in a selectable visual element labeled "Expand Plot," simply for the sake of nomenclature. Selection of the control element 665 causes the computing device 150, via the script 156, to direct the display device 172 to present an enlarged version of a corresponding graph. The enlarged version of the corresponding graph can be presented as an overlay onto the monitoring UI 600, in some cases. For example, selection of the control element 665 corresponding to the graph 630—the station load graph—can cause the presentation of the graph 810 shown in FIG. 8. The graph 810 can be presented as an overlay on the monitoring UI 600. In other cases, the graph 810 can be presented as a standalone object.

In some embodiments, the operational quantity presented in a first graph of the multiple graphs can be configured using a control element included in a second area 680 within the monitoring UI 600. More specifically, the control element permits selecting a particular source point and a corresponding dataset defining values of a metric that quantifies an operating state of a component of the DER, where the component corresponds to the source point. The control element is embodied in the selectable visual element 234 described hereinbefore. As mentioned, selection of the selectable visual element 234 can cause the computing device 150, via the script 156, to direct the display device 172 to present the user interface embodying the point search tool. The point search tool can permit selecting the particular source point. The particular source point (e.g., PI point 1384) can be listed in a fillable field 684 in the second area 680, to convey the customized metric being presented in the first graph of the multiple graphs.

The layout of multiple areas in the configuration UI 600 still further includes a third area 690. The third area 690 includes a visual representation of the DER that has been selected via the control element 614. As is shown in FIG. 6, the visual representation can be embodied in a one-line diagram of the selected DER.

The monitoring UI 600 also can include a visual element 670 that conveys operating status of the DER that has been selected via the control element 614. The operating status can be identified by a portion of the DER signaling 148. By conspicuously presenting operating status, the monitoring UI 600 permits an end-user to determine whether the DER is performing correctly.

Figure 9:
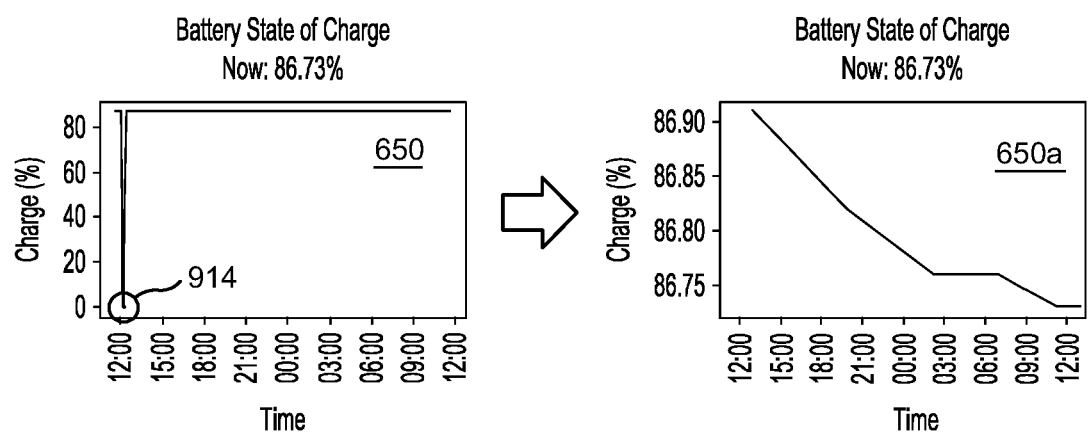
FIG. 9 illustrates an example of functionality included in the monitoring DER performance, in accordance with one or more embodiments of this disclosure.

In some cases, a communication session with the data source subsystem 130 (FIG. 1) can unintentionally end. As a result, one or more corrupt data can substitute DER data within the DER data 144 prior to that session being re-established. Thus, a corrupt datum may be incorporated into a graph presenting a time series of a metric corresponding to a DER that has been selected for monitoring. As an example, the graph 650 presenting state of charge data for Battery A (or any other selected battery) may incorporate a corrupt datum 914 (FIG. 9). In some embodiments, the computing device 150, via the script 156, for example, can detect such a corrupt datum by executing, or continuing to execute, the script 156. More specifically, execution of the script 156 can result in the execution of an outlier detection process. Although not depicted in FIG. 1, processor-executable instructions defining the outlier detection process can be retained in non-volatile memory 162. Those instructions can be part of a library 165 of utility processes retained in the non-volatile memory 162 and linked to the script 156 at runtime. The script 156 can invoke the outlier detection process at runtime. The outlier detection process can be executed periodically, with at a user-defined detection frequency. That user-defined detection frequency can be retained as a control attribute within the attributes 164. The outlier detection process also can be executed in time-shifted fashion, at a time after DER data become available. The outlier detection process can implement one of liner regression, Chebyshev, and density-based spatial clustering of applications with noise (DBSCAN).

In scenarios where a selected DER includes a battery energy storage system (BESS), the outlier detection process can implement a physics-based technique that can correlate BESS output (e.g., voltage, current, power) delivered against sensors deployed on the power system domain (e.g., within the grid equipment 120 and/or the distributed energy resources 110). Discrepancies between expected output and observed output may indicate a potential issue and presence of an outlier datum or outlier data. By executing the outlier detection process during execution of the script 156, the computing device 150 can determine such correlation in essentially real-time, as DER data become available.

In response to detecting the corrupt datum 914, by continuing executing the script 156, the computing device 150 can remove the corrupt datum 914 and can direct the display device 172 to redraw at least the graph 650. Therefore, the redrawn monitoring UI 600 can include an updated graph 650a, as is shown in FIG. 9.

Figure 10A:
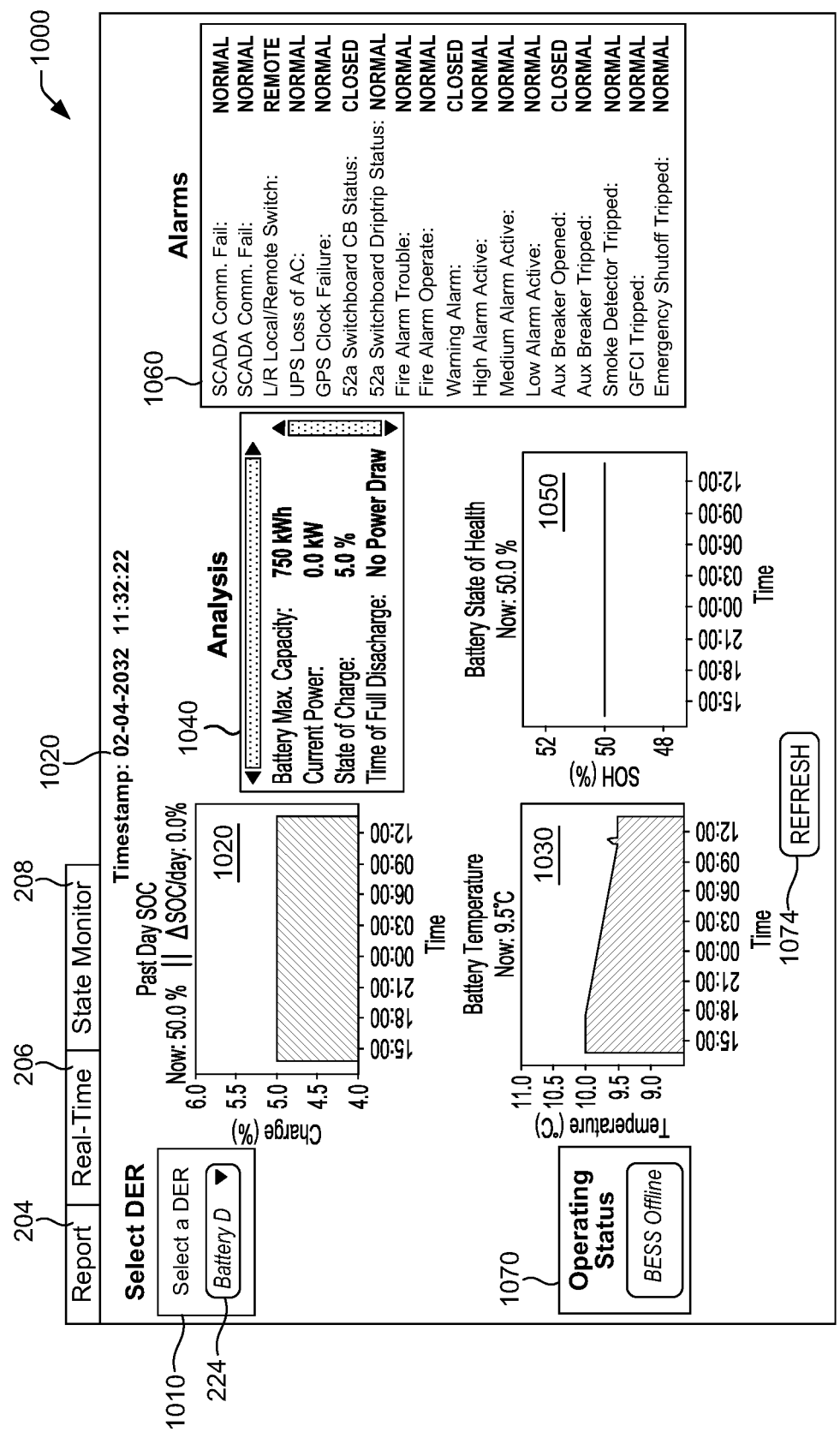
FIG. 10A illustrates an example of another a user interface that permits monitoring a DER, in accordance with one or more embodiments of this disclosure.

FIG. 10A illustrates an example of another monitoring user interface 1000 (monitoring UI 1000) that permits monitoring operating conditions of a DER, in accordance with one or more embodiments of this disclosure. The computing device 150, via the script 156, can cause the display device 172 to present the monitoring UI 1000 in response to selection of the third selectable tab 208. The monitoring UI 1000 includes the first selectable tab 204, the second selectable tab 206, and the third selectable tab 208.

The monitoring UI 1000 includes a layout of multiple areas. A subgroup of the multiple areas includes a first area 1010 having the control element 224 that, as is described herein, permits selecting a particular DER for monitoring of operating conditions.

The layout of multiple areas also includes a second area 1040 that presents results from computations based on current performance of the DER that has been selected via the control element 224. As an example, the analysis shown in the second area 1040 in FIG. 10A corresponds to Battery D (see text in the control element 224 in FIG. 10A). In that analysis, in response to being executed, the script 156 (FIG. 1) can determine a prediction of a time when the Battery D is fully discharged. That is, the computing device 150, via the script 156, can determine the predicted time of full discharge for Battery D. As is shown in FIG. 10A, in a scenario where current power is zero, the computing device 150 causes, via the script 156, the display device 172 to present the phrase "No Power Draw" within the area 1040, trailing the string "Time of Full Discharge." In a scenario where current power is less than zero, the computing device 150 causes, via the script 156, the display device 172 to present the phrase "Charging" within the area 1040, trailing the string "State of Charge." In a scenario where current power is greater than zero, the computing device 150 causes the display device 172 to present the predicted time of full discharge, within the area 1040, trailing the string "Time of Full Discharge."

The computing device 150, in response to execution of the script 156, also can perform other computations that implement other types of analyses. One or more of those other analyses can be implemented in addition to or instead of prediction of time to full discharge. One example of those other analyses includes assessment of the rate of discharge—e.g., actual SOC depletion in a defined time interval (such as one hour) versus theoretical depletion. Sudden depletion in DER performance (e.g., BESS performance) can be an indication of unsatisfactory State of Health of the DER (e.g., a Battery D, as is shown in element 224 (FIG. 10A)). Unsatisfactory State of Health can trigger predictive or corrective maintenance of the DER. In other words, in response to the unsatisfactory State of Health, the computing device 150 can generate data defining a time at which maintenance of the DER is recommended or can prompt (by passing a message, for example) a scheduler component to schedule maintenance of the DER. The scheduler component can be remotely located relative to the computing device 150.

Examples of other analyses also include islanding analysis for counting number of times a battery, for example, was activated over a past time interval (e.g., last 14 days) and timestamps and duration of an event (e.g., timestamp and duration of activation of equipment); monitoring of power consumed and power delivered over a past defined interval (e.g., last 24 hours); monitoring of energy acquired (e.g., power times charging) and/or energy delivered (e.g., power times discharging time); collection of noteworthy alarms and respective timestamps over a defined past time interval (e.g., last seven days)—in case an operator missed any alarms in real time. A noteworthy alarm can be a user-defined alarm and/or an alarm that satisfies an escalation criterion, for example.

The area 1040 also includes selectable navigation elements (represented by solid triangles in various orientations) that permit perusing multiple analyses for each DER asset and also permit reviewing information within an analysis. A first pair of selectable navigation elements arranged along the major side of the area 1040 permit, in response to being individually selected, transitioning from one frame containing information from a first analysis to another frame containing information from a second analysis. To that end, in response to such a selection, the script 156 can cause the display device 172 to redraw at least the area 1040 and content therein. A second pair of selectable navigation elements arranged along the minor side of the area 1040 permit, in response to being individually selected, scrolling upward and scrolling downward to update the visible information of an analysis. To that end, in response to such a selection, the script 156 can cause the display device 172 to redraw at least the area 1040 and content therein.

The layout of multiple areas within the monitoring UI 1000 also includes a third area 1060 that presents a listing of alarms configured for the DER that has been selected, via the control element 224, and respective statuses of the alarms. A portion of the DER signaling 148 (FIG. 1) can define such statuses. In some cases, a status of an alarm can indicate a normal condition or an abnormal condition. Accordingly, the status can be represented by one of "Normal" or "Abnormal." In a normal condition, a component corresponding to the alarm may not be subjected to an operating issue. In an abnormal condition, the component may be subjected to an issue. Text, or other markings, can convey each one of the respective statuses of the alarms. The text, or markings, can be formatted according to a value of the status. For example, color of the text can be dictated by the value of the status. As such, a value of the status that indicates presence of an issue with the alarm can be conveyed with a first color and/or first type of font, e.g., red and boldface font. Another value of the status that indicates absence of an issue with the alarm can be conveyed with a second color and/or second type of font, e.g., green and/or regular font. In this way, an overall operating status of the DER can be conveyed efficiently and conspicuously.

The monitoring UI 1000 also includes multiple graphs, each conveying data indicative of an operating condition of the DER that has been selected via the control element 224. As such, markings that constitute a graph can be formatted according to value(s) of the operating condition. In one example, in response to executing the script 156, the computing device 150 can configure color of the markings based on the value(s) of the operating condition. In some embodiments, the computing device 150, via the script 156, can configure visual elements indicative of a time series of the values of a metric presented in a graph of the multiple graphs. The visual elements can conspicuously convey that each one of the values of the metric is satisfactory or unsatisfactory. Accordingly, the multiple graphs permit determining whether the selected DER is performing as expected.

The multiple graphs include a first graph 1020 and a second graph 1030. As an example, the first graph 1020 presents a time series of data indicative of a state of charge (SOC). In particular, the graph 1020 presents data indicative of past-day SOC. The first graph 1020 can present data according to a formatting scheme, including a color (e.g., red, represented by hatching of a first type in FIG. 10A and FIG. 10B) and filled area under curve. Additionally, the second graph 1030 presents a time series of data indicative of temperature of the selected DER; e.g., temperature of Battery D. The second graph 1030 can present data according to another formatting scheme, including a color (e.g., green, represented by hatching of a first type in FIG. 10A and FIG. 10B) and filled area under curve.

Figure 10B:
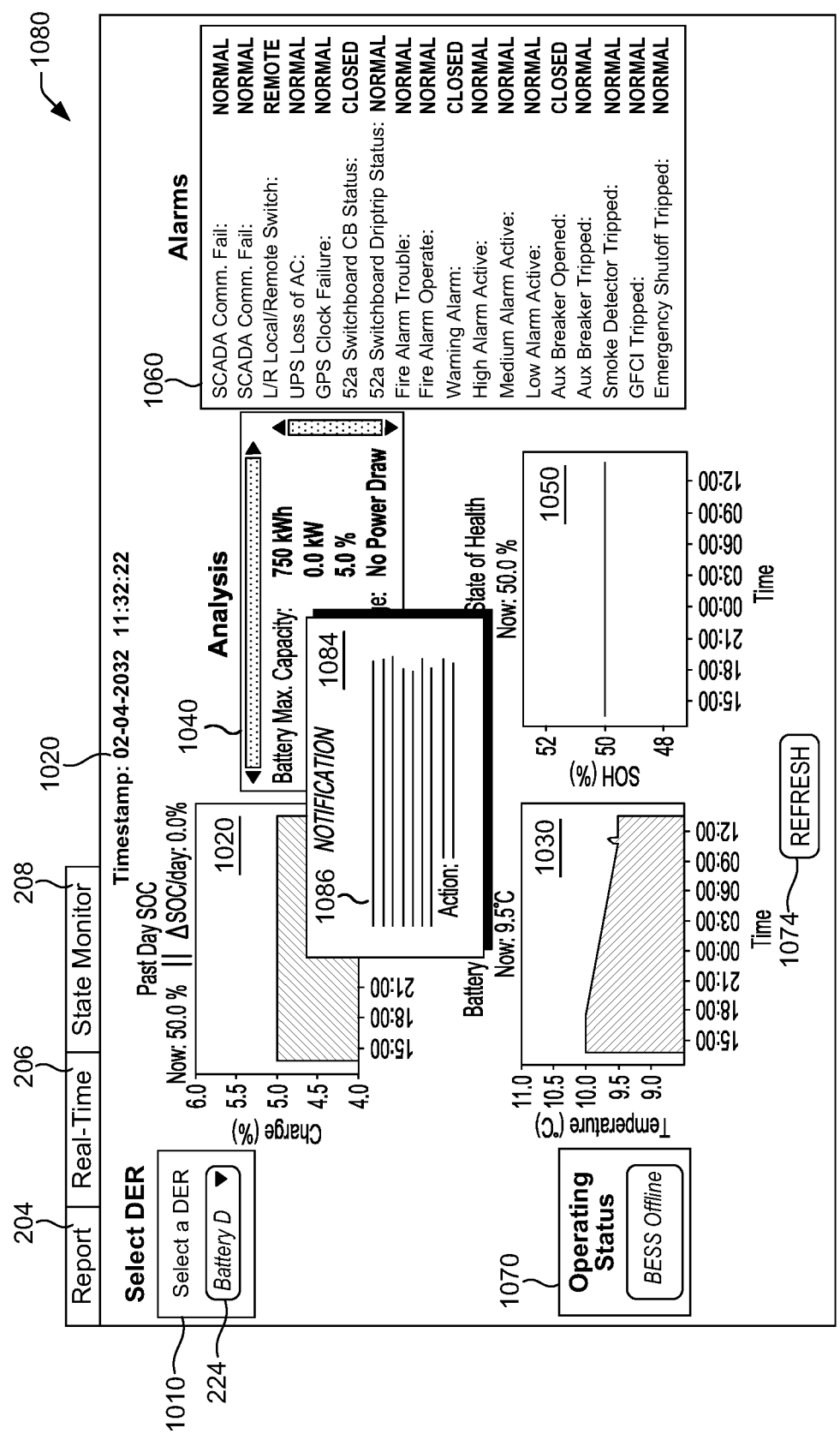
FIG. 10B illustrates an example of another a user interface that permits monitoring a DER, in accordance with one or more embodiments of this disclosure.

In situations where the computing device 150, via the script 156, detects anomalous performance of the selected DER, the computing device 150 is detected, the computing device 150 can present an overlay element (or pop-up window) as a warning of the anomalous performance and, in some cases, of an action to be performed in response to the anomalous performance. The anomalous performance can include presence of an alarm, a value of a state variable being out of satisfactory range, or similar. To determine anomalous performance, in some cases, the computing device 150 can apply one or more rules to received DER data 144 and/or DER signaling 148. Such rule(s) can be configurable and can be retained in one or more memory elements 168 (referred to as rules 168) within the non-volatile memory 162 and can include threshold values, historical values of state variables for the selected DER, satisfactory ranges of state variable for the selected DER, and the like. In some cases, in response to execution, the script 156 can determine a root cause of the anomalous performance. For example, the script 156 can implement root-cause analysis after a determination that anomalous performance is present in the DER data 144 and/or the DER signaling 148. As an illustration, FIG. 10B presents a UI 1080 having an overlay element 1080 onto a section of the UI 1000. The overlay element 1084 can include markings, such as text, that can conspicuously indicate presence of the anomalous performance. The overlay element 1084 also can include second markings 1086 (schematically represented by multiple segments) presenting a description of the anomalous performance and/or a recommended action to be performed. Such a description can indicate, among other things, if an event related to the anomalous performance has been previously detected during the monitoring of the selected DER.

The monitoring UI 1000 further includes indicia 1020 identifying a timestamp of the creation of the multiple graphs, and a control element 1074 embodied in a selectable visual element labeled "Refresh," simply for the sake of nomenclature. Selection of the control element 1074 causes the computing device 150, via the script 156, to redraw the monitoring UI 1000, presenting updated data within the multiple graphs. The updated data can be current DER data, available at substantially the time of selecting the control element 1074. An updated datum corresponding to the metric presented in a graph of the multiple graphs can be conveyed using text including the characters "Now:"

The multiple graphs contained in the monitoring UI 1000 also include a graph 1050 that presents results identifying a state of health (SOH) for the DER that has been selected via the control element 224. The computing device 150, in response to execution of the script 156, can determine those results based on historic performance of the selected DER. To that end, the computing device 150, in response to executing the script 156, can determine actual power delivered and expected power delivered for the selected DER, and can track those determined amounts over time. Results of the tracking can, in some cases, indicate degradation of the performance of the selected DER (e.g., a BESS). Thus, in those cases, performance degradation can be tracked over time, potentially providing indications of sudden or long-term BESS failure. The computing device 150 can track and learn the proportion of actual power delivered relative to expected power delivered for various ranges of SOC; for example, 100% to 80% SOC range, 80% to 60% SOC range, 60% to 40% SOC range, and so forth. As a result, over time, execution of the script 156 can provide a metric that quantifies the SOC of the selected DER based on SOC. As an example, the graph 1050 shown in FIG. 10A presents SOH of the Battery D (see text in the control element 224 in FIG. 10A). Accordingly, the SOH can be quantified in percentage points.

The monitoring UI 1000 further includes a visual element 1070 that conveys operating status of the DER that has been selected via the control element 224. The operating status can be identified by a portion of the DER signaling 148 (FIG. 1). By conspicuously presenting operating status, the monitoring UI 1000 permits an end-user to determine whether the DER is performing correctly.

Figure 11A:
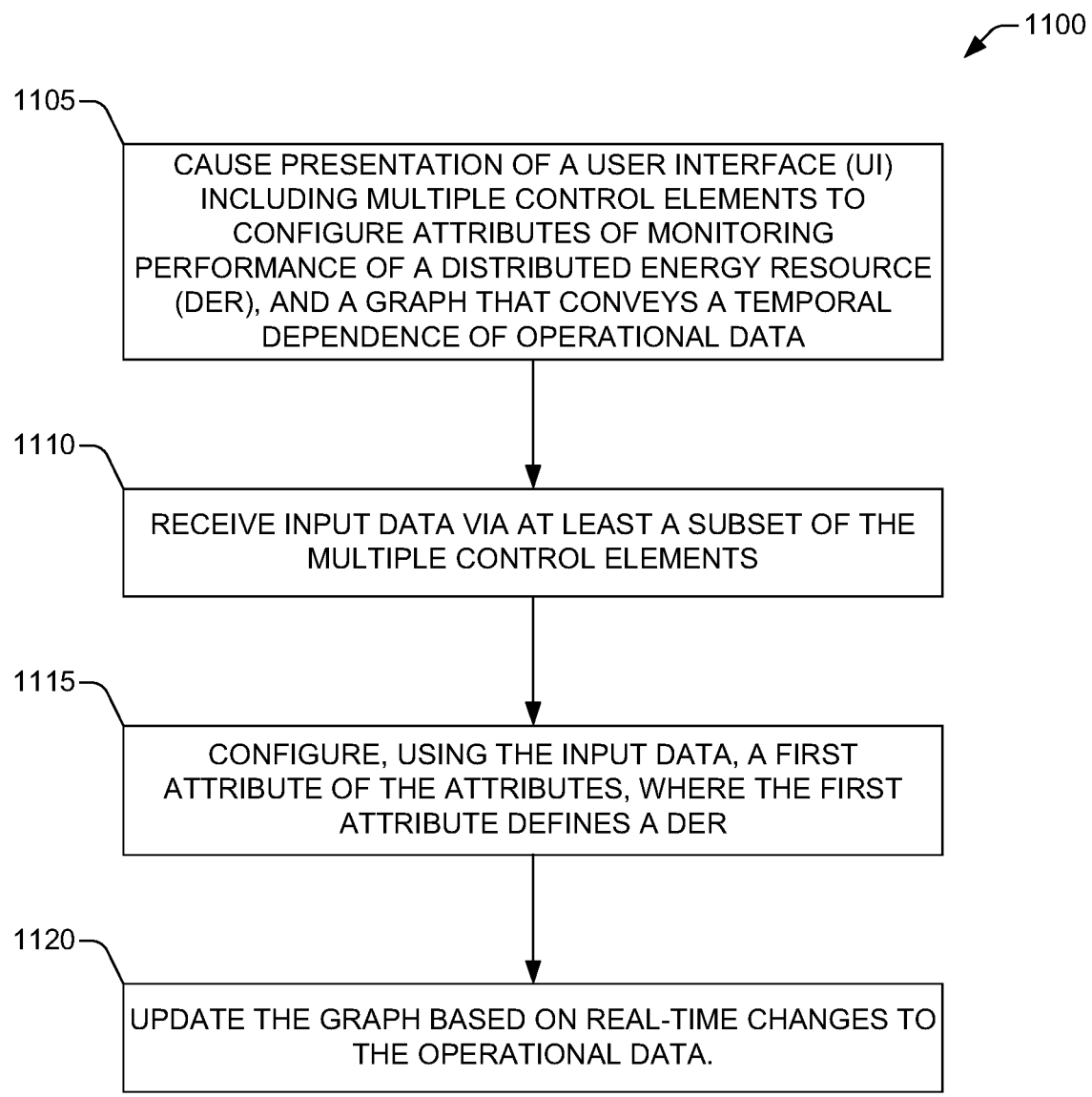
FIG. 11A illustrates an example method, in accordance with one or more embodiments of this disclosure.
Figure 11B:
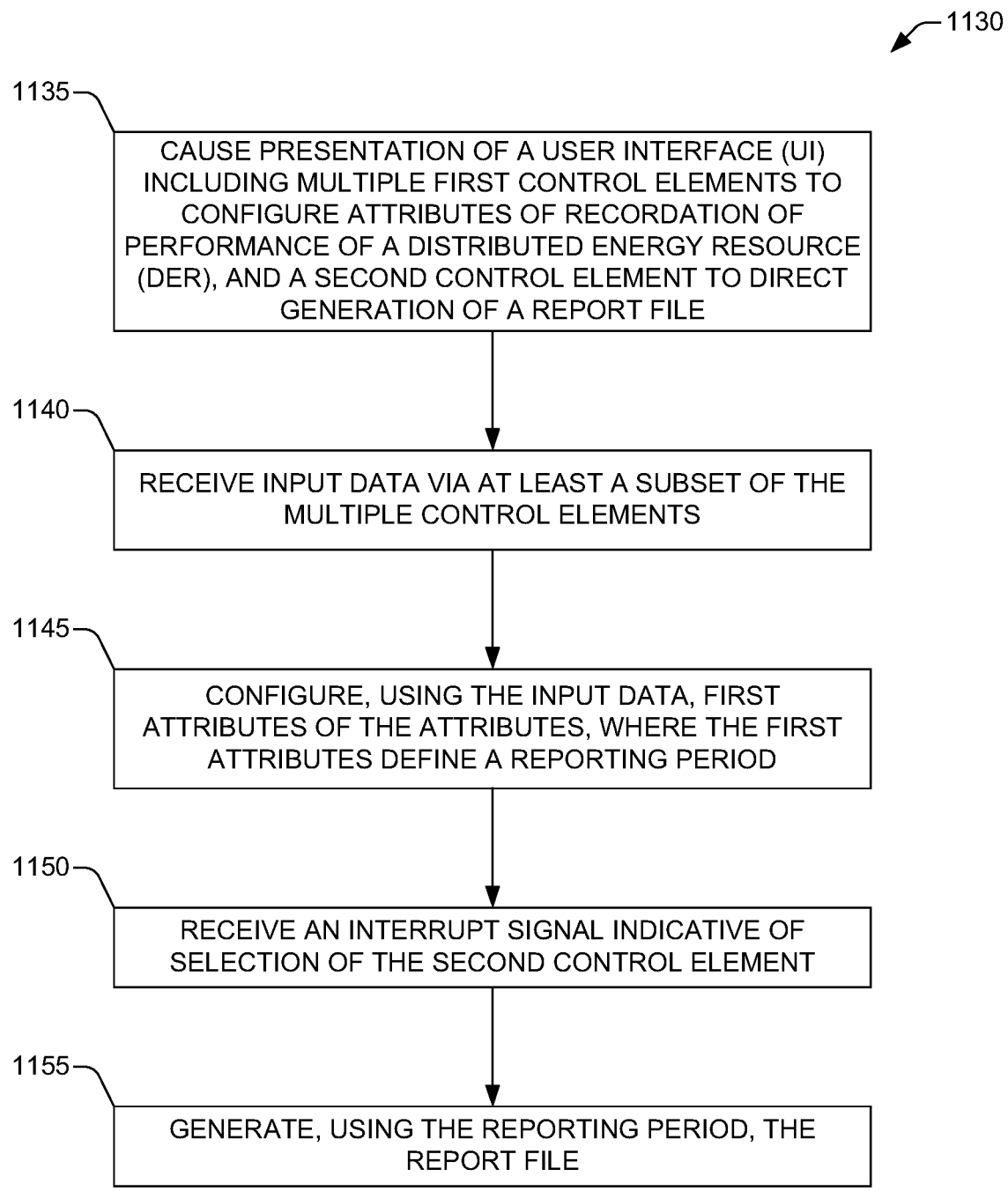
FIG. 11B illustrates an example method, in accordance with one or more embodiments of this disclosure.
Figure 11C:
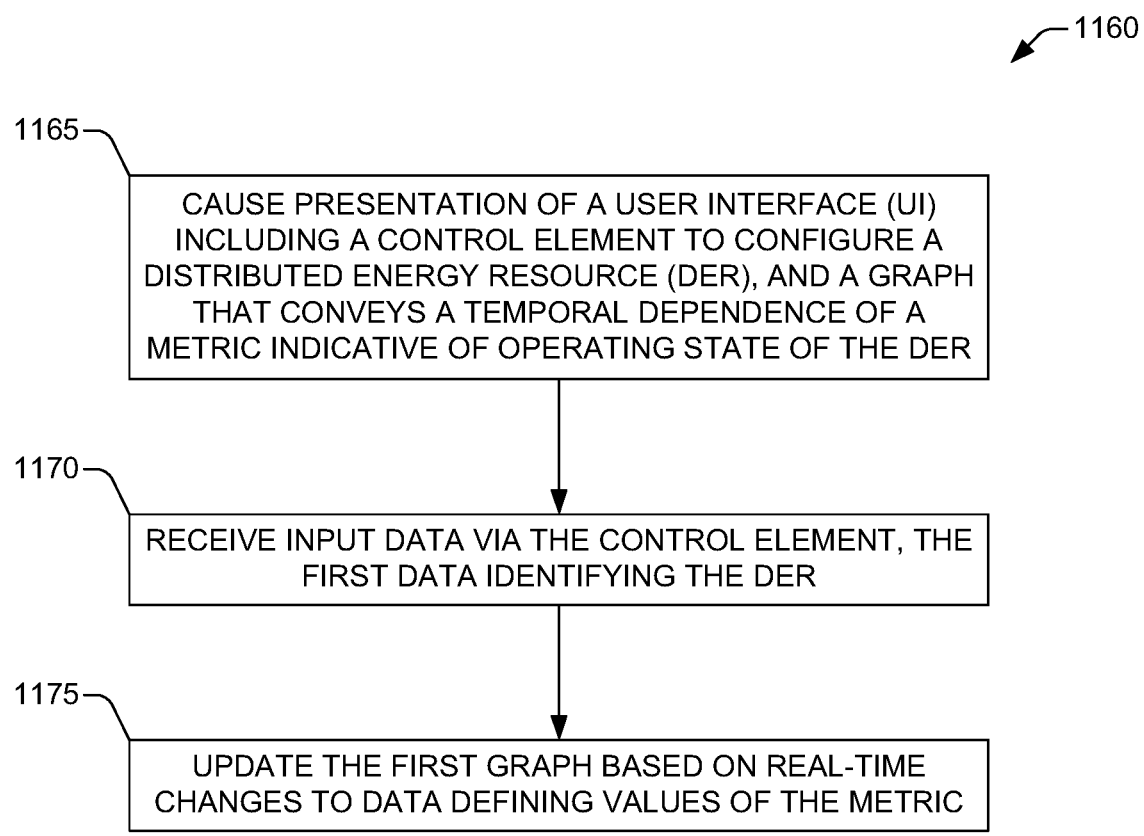
FIG. 11C illustrates an example method, in accordance with one or more embodiments of this disclosure.

In view of the aspects described herein, example methods that may be implemented in accordance with this disclosure can be better appreciated with reference, for example, to the flowcharts in FIGS. 11A-11C. For the sake of simplicity of explanation, the example methods disclosed herein are presented and described as a series of blocks (with each block representing an operation in a method, for example). However, the example methods are not limited by the order of blocks and associated actions or operations, as some blocks may occur in different orders and/or concurrently with other blocks from those that are shown and described herein. Further, not all illustrated blocks, and associated operation(s), may be required to implement an example method in accordance with one or more aspects of the disclosure. Two or more of the example methods (and any other methods disclosed herein) may be implemented in combination with each other. It is noted that the example methods (and any other methods disclosed herein) may be alternatively represented as a series of interrelated states or events, such as in a state diagram.

The methods in accordance with this disclosure, such as the example methods shown in FIGS. 11A-11C, can be retained on an article of manufacture, or computer-readable storage medium, to permit or facilitate transporting and transferring such methods to a computing device (e.g., a desktop computer; a mobile computer, such as a tablet, or a smartphone; a mobile telephone; a blade computer; a programmable logic controller; and the like) for execution, and thus implementation, by a processor of the computing device or for storage in a memory thereof or functionally coupled thereto. One or more processors, such as processor(s) that implement (e.g., execute) one or more of the disclosed methods, can be employed to execute processor-accessible instructions (e.g., processor-executable instructions and processor-readable instructions) retained in a memory, or any computer- or machine-readable medium, to execute or otherwise implement the one or more of the disclosed methods. The processor-accessible instructions can provide a computer-executable or machine-executable framework to implement the methods described herein.

FIG. 11A illustrates an example of a method 1100 for monitoring performance of a DER, in accordance with one or more embodiments of this disclosure. A computing device can implement the example method 1100 in its entirety or in part. To that end, the computing device includes computing resources that can implement at least one of the blocks included in the example method 1100. The computing resources include, for example, central processing units (CPUs), graphics processing units (GPUs), tensor processing units (TPUs), memory, disk space, incoming bandwidth, and/or outgoing bandwidth, interface(s) (such as I/O interfaces or APIs, or both); controller devices(s); power supplies; a combination of the foregoing; and/or similar resources. For instance, the computing system can include programming interface(s); an operating system; software for configuration and or control of a virtualized environment; firmware; and similar resources. In some embodiments, the computing device can embody, or can constitute, the computing device 150 (FIG. 1). As such, the computing device can execute the script 156 to perform the operations, individually or in combination, described in connection with the blocks included in the example method 1100.

At block 1105, the computing device can cause presentation of a user interface (UI). The computing device can cause presentation of the UI during execution of a script at the computing device. Causing the presentation of the UI can include causing presentation of a visual element indicative of an operating status of the DER. The UI includes multiple control elements to configure respective attributes of monitoring operational data indicative of performance of a DER. The UI also includes a graph that conveys a temporal dependence of first data contained in the operational data. The first data can identify values of a metric that quantifies an operating state of the DER.

At block 1110, the computing device can receive input data via at least a subset of the multiple control elements. The input data can be received during the execution of the script.

At block 1115, the computing device can configure, using the input data, a first attribute of the respective attributes, where the first attribute defines the DER. The first attribute can be configured during the execution of the script. In some cases, the computing device can cause presentation, on the UI, of a visual representation of the DER in response to configuring the first attribute of the respective attributes.

At block 1120, the computing device can update the first graph based on real-time changes to the first data.

Although not illustrated in FIG. 11A, in some embodiments of the example method 1100, the UI can include a second graph that conveys a temporal dependence of second data contained in the operational data, the second data identifying values of a second metric that quantifies a second operating state of the DER. In some cases, the DER can be embodied in, or can include, a battery, and the operating state comprises state of charge and the second operating state comprises AC bus state. In those embodiments, the computing device can update the second graph based on based on real-time changes to the second data. In addition, the UI also can include a second control element, and the computing device can receive an interrupt signal indicative of selection of the second control element; and in response to the selection of the second control element, the computing device can update the first graph; and also can update the second graph.

FIG. 11B illustrates an example of a method 1130 for reporting performance of a DER, in accordance with one or more embodiments of this disclosure. A computing device can implement the example method 1130 in its entirety or in part. To that end, the computing device includes computing resources that can implement at least one of the blocks included in the example method 1130. The computing resources include, for example, central processing units (CPUs), graphics processing units (GPUs), tensor processing units (TPUs), memory, disk space, incoming bandwidth, and/or outgoing bandwidth, interface(s) (such as I/O interfaces or APIs, or both); controller devices(s); power supplies; a combination of the foregoing; and/or similar resources. For instance, the computing system can include programming interface(s); an operating system; software for configuration and or control of a virtualized environment; firmware; and similar resources. In some embodiments, the computing device can embody, or can constitute, the computing device 150 (FIG. 1). As such, the computing device can execute the script 156 to perform the operations, individually or in combination, described in connection with the blocks included in the example method 1130.

At block 1135, the computing device can cause presentation of a user interface (UI). The computing device can cause presentation of the UI during execution of a script at the computing device. The UI includes multiple first control elements to configure respective attributes of recordation of data indicative of performance of a DER, and a second control element to direct generation of a report file containing a portion of the data indicative of the performance of the DER.

At block 1140, the computing device can receive input data via a subset of the multiple first control elements. The input data can be received, during the execution of the script.

At block 1145, the computing device can configure, during the execution of the script, using the input data, multiple attributes of the respective attributes. The multiple attributes define a reporting period. In some embodiments, the computing device can cause presentation, on the UI, of a visual representation of the DER in response to the configuring.

At block 1150, the computing device can receive, during the execution of the script, an interrupt signal indicative of selection of the second control element. In some embodiments, other interrupt signals also can be received. In one example, the computing device can receive an interrupt signal indicative of selection of a particular one of the multiple first control elements. Responsive to the selection of the particular one of the multiple first control elements, the computing device can configure, during execution of the script, a particular attribute of the respective attributes. That particular attribute can be indicative of inclusion of a graph within the report file.

In addition, or in another example, the computing device can receive an interrupt signal indicative of selection of a particular one of the multiple first control elements. Responsive to such a selection, the computing device can cause presentation of a menu of selectable source points corresponding to respective components of the DER. Further, or in yet another example, the computing device can receive a second interrupt signal indicative of selection of a first selectable source point in the menu of selectable source points. Responsive to such a selection, the computing device can configure second data for recordation in the report file, the second data being contained in the data indicative of performance of the DER and identifying values of a metric that quantifies operation of a first component of the respective components of the DER.

At block 1155, the computing device can generate, using the reporting period, the report file. The report file can include the portion of the data indicative of the performance of the DER. Generating, using the reporting period, can include formatting the report file to be accessible by one or more of spreadsheet software or data processing software. Additionally, generating, using the reporting period, also can include storing, according to the reporting period and the recordation time interval, the portion of the data in a non-volatile memory device.

Although not illustrated in FIG. 11B, in some embodiments of the example method 1130, the computing device can receive, during the execution of the script, second input data via a particular one of the multiple first control elements. Based on the second input data, the computing device can configure, during the execution of the script, using the second input data, a first attribute of the respective attributes, wherein the first attribute defines the DER. Additionally, or in some cases, the computing device can receive, during the execution of the script, third input data via a second particular one of the multiple first control elements. Based on the third input data, the computing device can configure, during the execution of the script, using the third input data, a second attribute of the respective attributes, wherein the second attribute defines a recordation time interval between successive data that are recorded.

FIG. 11C illustrates an example of a method 1160 for reporting performance of a DER, in accordance with one or more embodiments of this disclosure. A computing device can implement the example method 1160 in its entirety or in part. To that end, the computing device includes computing resources that can implement at least one of the blocks included in the example method 1160. The computing resources include, for example, central processing units (CPUs), graphics processing units (GPUs), tensor processing units (TPUs), memory, disk space, incoming bandwidth, and/or outgoing bandwidth, interface(s) (such as I/O interfaces or APIs, or both); controller devices(s); power supplies; a combination of the foregoing; and/or similar resources. For instance, the computing system can include programming interface(s); an operating system; software for configuration and or control of a virtualized environment; firmware; and similar resources. In some embodiments, the computing device can embody, or can constitute, the computing device 150 (FIG. 1). As such, the computing device can execute the script 156 to perform the operations, individually or in combination, described in connection with the blocks included in the example method 1130.

At block 1165, the computing device can cause presentation of a user interface (UI). The computing device can cause presentation of the UI during execution of a script at the computing device. Causing the presentation of the UI comprises causing presentation of a visual element indicative of an operating status of the DER. The UI includes a control element to configure a DER for monitoring operational status, and a first graph that conveys a temporal dependence of first data defining values of a metric indicative of operating state of the DER. In some cases, the UI also can include multiple visual elements indicative of respective alarm statuses pertaining to the DER, wherein a first visual element of the multiple visual elements comprises first text that identifies an alarm and second text that conspicuously convey that the alarm is in a normal state or an abnormal state.

At block 1170, the computing device can receive input data via the control element, the input data identifying the DER. The input data can be received during the execution of the script.

At block 1175, the computing device can update the first graph based on real-time changes to the first data. Updating the first graph can include causing presentation of visual elements indicative of a time series of the values of the metric, the visual elements conspicuously conveying that each one of the values of the metric is satisfactory or unsatisfactory.

In some embodiments, the UI caused to be presented at block 1165 also can include a second graph that conveys a temporal dependence of second data defining values of a second metric indicative of the operating state of the DER. Although not shown in FIG. 11C, in those embodiments, the example method 1160 also can include updating the second graph based on real-time changes to the second data. Updating the second graph can include presenting second visual elements indicative of a time series of the values of the second metric. The second visual elements can conspicuously convey that each one of the values of the second metric is satisfactory or unsatisfactory.

Figure 12:
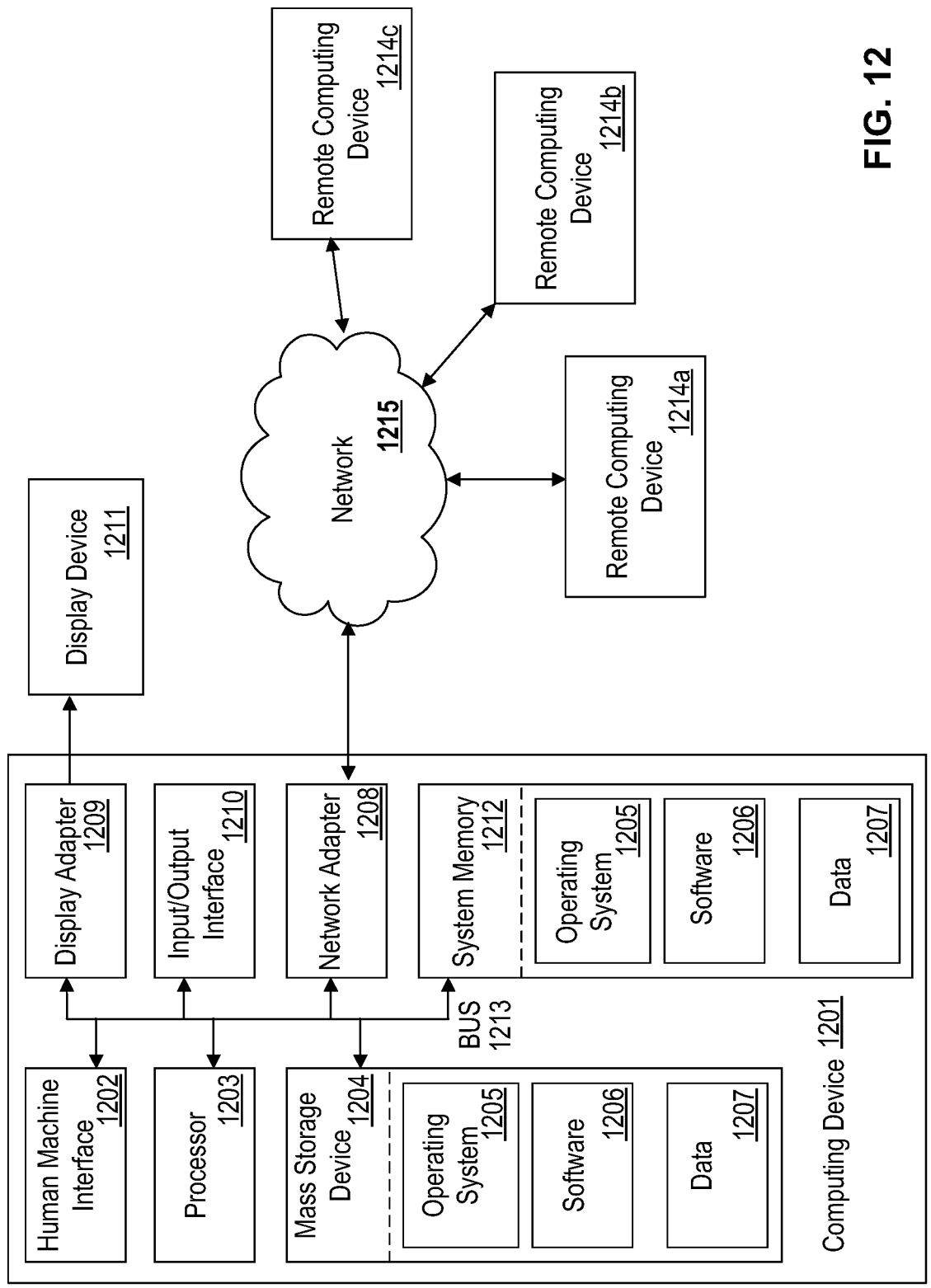
FIG. 12 illustrates an example of another operating environment that can implement reporting and monitoring of DERs in accordance with one or more embodiments of this disclosure.

In order to provide some context, the computer-implemented methods, devices, and systems of this disclosure can be implemented on the computing environment illustrated in FIG. 12 and described below. Similarly, the computer-implemented methods, devices, and systems disclosed herein can utilize one or more computers to perform one or more functions in one or more locations. FIG. 12 is a block diagram illustrating an example of a computing environment for performing the disclosed methods and/or implementing the disclosed systems. The operating environment shown in FIG. 12 is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The computer-implemented methods and systems in accordance with this disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, table computers, and multiprocessor systems. Additional examples comprise set-top boxes, programmable consumer electronics, network PCs, minicomputers, mainframe computers, distributed computing environments that comprise any of the above systems or devices, and the like.

The processing of the disclosed computer-implemented methods and systems can be performed by software components. The software components can include the script 156 (FIG. 1) and the intake client 158 (FIG. 1). The disclosed systems and computer-implemented methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and computer-implemented methods disclosed herein can be implemented via a general-purpose computing device in the form of a computing device 1201. The components of the computing device 1201 can comprise one or more processors 1203, a system memory 1212, and a system bus 1213 that couples various system components including the one or more processors 1203 to the system memory 1212. The system can utilize parallel computing.

The system bus 1213 represents one or more of several possible types of bus structures, including a memory bus or memory controller, a peripheral bus, an accelerated graphics port, or local bus using any of a variety of bus architectures. The bus 1213, and all buses specified in this description can also be implemented over a wired or wireless network connection and each of the subsystems, including the one or more processors 1203, a mass storage device 1204, an operating system 1205, software 1206, data 1207, a network adapter 1208, the system memory 1212, an Input/Output Interface 1210, a display adapter 1209, a display device 1211, and a human-machine interface 1202, can be contained within one or more remote computing devices 1214a, b,c at physically separate locations, connected through buses of this form, in effect implementing a fully distributed system. The software 1206 can include the script 156 and the intake client 158.

The computing device 1201 typically comprises a variety of computer-readable media. Exemplary readable media can be any available media that is accessible by the computing device 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data such as the data 1207 and/or program modules such as the operating system 1205 and the software 1206 that are immediately accessible to and/or are presently operated on by the one or more processors 1203.

In another aspect, the computing device 1201 can also comprise other removable/non-removable, volatile/non-volatile computer storage media. By way of example, FIG. 12 illustrates the mass storage device 1204 which can provide non-volatile storage of computer code, computer readable instructions, data structures, program modules, and other data for the computing device 1201. For example and not meant to be limiting, the mass storage device 1204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1204, including by way of example, the operating system 1205 and the software 1206. Each of the operating system 1205 and the software 1206 (or some combination thereof) can comprise elements of the programming and the software 1206. The data 1207 can also be stored on the mass storage device 1204. The data 1207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In some embodiments, the attributes 164, reports 166, rules 168, and library 165 can be retained in the mass storage device 1204 and/or the system memory 1212, as part of data 1207, for example.

In another aspect, the user can enter commands and information into the computing device 1201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1203 via the human-machine interface 1202 that is coupled to the system bus 1213, but can be connected by other interface and bus structures, such as a parallel port, game port, an IEEE 1394 Port (also known as a Firewire port), a serial port, or a universal serial bus (USB).

In yet another aspect, the display device 1211 can also be connected to the system bus 1213 via an interface, such as the display adapter 1209. It is contemplated that the computing device 1201 can have more than one display adapter 1209 and the computing device 1201 can have more than one display device 1211. For example, the display device 1211 can be a monitor, an LCD (Liquid Crystal Display), or a projector. In addition to the display device 1211, other output peripheral devices can comprise components such as speakers (not shown) and a printer (not shown) which can be connected to the computing device 1201 via the Input/Output Interface 1210. Any operation and/or result of the methods can be output in any form to an output device. Such output can be any form of visual representation, including, but not limited to, textual, graphical, animation, audio, tactile, and the like. The display device 1211 and computing device 1201 can be part of one device, or separate devices.

The computing device 1201 can operate in a networked environment using logical connections to one or more remote computing devices 1214a,b,c. By way of example, a remote computing device can be a personal computer, portable computer, smartphone, a server, a router, a network computer, a peer device or other common network node, and so on. Logical connections between the computing device 1201 and a remote computing device 1214a,b,c can be made via a network 1215, such as a local area network (LAN) and/or a general wide area network (WAN). Such network connections can be through the network adapter 1208. The network adapter 1208 can be implemented in both wired and wireless environments. In an aspect, one or more of the remote computing devices 1214a,b,c can comprise an external engine and/or an interface to the external engine.

For purposes of illustration, application programs and other executable program components such as the operating system 1205 are illustrated herein as discrete blocks, although it is recognized that such programs and components reside at various times in different storage components of the computing device 1201, and are executed by the one or more processors 1203 of the computer. An implementation of the software 1206 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is to be understood that the methods and systems described here are not limited to specific operations, processes, components, or structure described, or to the order or particular combination of such operations or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers, or operations. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that serves simply as an example.

Operations and components described herein as being used to perform the disclosed methods and construct the disclosed systems are illustrative unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that can be performed or components that can be added, it is understood that each of these additional operations can be performed and components added with any specific embodiment or combination of embodiments of the disclosed systems and methods.

Embodiments of this disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked, or cloud-based.

Embodiments of this disclosure have been described with reference to diagrams, flowcharts, and other illustrations of computer-implemented methods, systems, apparatuses, and computer program products. Each block of the block diagrams and flowchart illustrations, and combinations of blocks in the block diagrams and flowchart illustrations, respectively, can be implemented by processor-accessible instructions. Such instructions can include, for example, computer program instructions (e.g., processor-readable and/or processor-executable instructions). The processor-accessible instructions can be built (e.g., linked and compiled) and retained in processor-executable form in one or multiple memory devices or one or many other processor-accessible non-transitory storage media. These computer program instructions (built or otherwise) may be loaded onto a general-purpose computer, special purpose computer, or other programmable data processing apparatus to produce a machine. The loaded computer program instructions can be accessed and executed by one or multiple processors or other types of processing circuitry. In response to execution, the loaded computer program instructions provide the functionality described in connection with flowchart blocks (individually or in a particular combination) or blocks in block diagrams (individually or in a particular combination). Thus, such instructions which execute on the computer or other programmable data processing apparatus create a means for implementing the functions specified in the flowchart blocks (individually or in a particular combination) or blocks in block diagrams (individually or in a particular combination).

These computer program instructions may also be stored in a computer-readable memory that can direct a computer or other programmable data processing apparatus to function in a particular manner, such that the instructions stored in the computer-readable memory produce an article of manufacture including processor-accessible instruction (e.g., processor-readable instructions and/or processor-executable instructions) to implement the function specified in the flowchart blocks (individually or in a particular combination) or blocks in block diagrams (individually or in a particular combination). The computer program instructions (built or otherwise) may also be loaded onto a computer or other programmable data processing apparatus to cause a series of operations to be performed on the computer or other programmable apparatus to produce a computer-implemented process. The series of operations can be performed in response to execution by one or more processor or other types of processing circuitry. Thus, such instructions that execute on the computer or other programmable apparatus provide operations for implementing the functions specified in the flowchart blocks (individually or in a particular combination) or blocks in block diagrams (individually or in a particular combination).

Accordingly, blocks of the block diagrams and flowchart illustrations support combinations of means for performing the specified functions in connection with such diagrams and/or flowchart illustrations, combinations of operations for performing the specified functions and program instruction means for performing the specified functions. Each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

The methods and systems can employ artificial intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the computer-implemented methods, apparatuses, devices, and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a computing device, from one or more sensors, operational data of a plurality of distributed energy resources (DERs);
generating, via a touch-screen interface of the computing device, based on execution of a script via a script interpreter program at the computing device, a user interface (UI) configured to display a layout according to a plurality of areas comprising: a first area of the plurality of areas comprising a plurality of control elements for configuring one or more attributes associated with monitoring the operational data associated with a DER selected from the plurality of DERs,
a second area of the plurality of areas comprising a video feed of the DER and location information of the DER overlaid onto the video feed, and
a third area of the plurality of areas comprising a graph of a temporal dependence of a portion of the operational data, wherein the portion of the operational data comprises values associated with a metric that quantifies an operating state of the DER;
receiving, via a user interaction with the touch-screen interface, user input selecting one or more control elements of the plurality of control elements;
configuring, via the script, based on the user input selecting the one or more control elements, at least one attribute of the one or more attributes;
determining, based on the execution of the script, the at least one attribute comprises corrupt data;
modifying the at least one attribute to remove the corrupt data;
generating, via the script, based on the modified at least one attribute, a report file according to a flat file format, wherein the report file comprises the portion of the operational data; and
causing, via the script, based on the operating state of the DER, corrective maintenance of the DER.

2. The method of claim 1, wherein the UI comprises a visual element indicative of an operating status of the DER.

3. The method of claim 1, wherein the plurality of areas further comprise a fourth area of the plurality of areas comprising a graph of a temporal dependence of a second portion of the operational data, wherein the second portion of the operational data comprises values associated with a second metric that quantifies a second operating state of the DER, wherein the method further comprises updating, based on one or more changes to the second portion of the operational data, the graph of the temporal dependence of the second portion of the operational data.

4. The method of claim 3, wherein the UI comprises a second control element, wherein the method further comprises:
updating, based on an interrupt signal indicative of a selection of second one or more control elements of the plurality of control elements, the graph of the temporal dependence of the portion of the operational data and the graph of the temporal dependence of the second portion of the operational data.

5. The method of claim 3, wherein the DER comprises a battery, and wherein the operating state comprises a state of charge of the battery and the second operating state comprises an AC bus state.

6. The method of claim 3, wherein the graph comprises one or more visual elements indicative of a time series of the values of the second metric.

7. The method of claim 1, further comprising:
causing, based on input data via a second one or more control elements of the plurality of control elements, a menu of selectable source points corresponding to respective components of the DER to be displayed.

8. The method of claim 7, further comprising:
updating, based on an interrupt signal indicative of a selection of a first selectable source point in the menu of selectable source points, a graph of a temporal dependence of a second portion of the operational data, wherein the second portion of the operational data comprises values associated with a metric that quantifies operation of a component of the respective components of the DER.

9. The method of claim 1, further comprising causing, based on configuring the at least one attribute, the UI to display a visual representation of the DER.

10. The method of claim 1, wherein the graph comprises one or more visual elements indicative of a time series of the values of the metric.

11. The method of claim 1, wherein the portion of the operational data is indicative of a performance of the DER.

12. The method of claim 1, wherein the plurality of areas further comprises a fourth area of the plurality of areas comprising first text that identifies an alarm and second text indicating that the alarm is in a normal state or an abnormal state.

13. One or more non-transitory computer-readable media storing processor-executable instructions that, when executed by at least one processor, cause the at least one processor to:

receive, by a computing device, from one or more sensors, operational data of a plurality of distributed energy resources (DERs);
generate, via a touch-screen interface of the computing device, based on execution of a script via a script interpreter program at the computing device, a user interface (UI) configured to display a layout according to a plurality of areas comprising:
- a first area of the plurality of areas comprising a plurality of control elements for configuring one or more attributes associated with monitoring the operational data associated with a DER selected from the plurality of DERs,
- a second area of the plurality of areas comprising a video feed of the DER and location information of the DER overlaid onto the video feed, and
- a third area of the plurality of areas comprising a graph of a temporal dependence of a portion of the operational data, wherein the portion of the operational data comprises values associated with a metric that quantifies an operating state of the DER;

receive, via a user interaction with the touch-screen interface, user input selecting one or more control elements of the plurality of control elements;
configure, via the script, based on the user input selecting the one or more control elements, at least one attribute of the one or more attributes;
determine, based on the execution of the script, the at least one attribute comprises corrupt data;
modify the at least one attribute to remove the corrupt data;
generate, via the script, based on the modified at least one attribute, a report file according to a flat file format, wherein the report file comprises the portion of the operational data; and
cause, via the script, based on the operating state of the DER, corrective maintenance of the DER.

14. The non-transitory computer-readable media of claim 13, wherein the UI comprises a visual element indicative of an operating status of the DER.

15. The non-transitory computer-readable media of claim 13, wherein the plurality of areas further comprise a fourth area of the plurality of areas comprising a graph of a temporal dependence of a second portion of the operational data, wherein the second portion of the operational data comprises values associated with a second metric that quantifies a second operating state of the DER, wherein the processor-executable instructions, when executed by the at least one processor, further cause the at least one processor to update, based on one or more changes to the second portion of the operational data, the graph of the temporal dependence of the second portion of the operational data.

16. The non-transitory computer-readable media of claim 15, wherein the UI comprises a second control element, wherein the processor-executable instructions, when executed by the at least one processor, further cause the at least one processor to:
update, based on an interrupt signal indicative of a selection of second one or more control elements, the graph of the temporal dependence of the portion of the operational data and the graph of the temporal dependence of the second portion of the operational data.

17. The non-transitory computer-readable media of claim 15, wherein the DER comprises a battery, and wherein the operating state comprises a state of charge of the battery and the second operating state comprises an AC bus state.

18. The non-transitory computer-readable media of claim 15, wherein the graph comprises one or more visual elements indicative of a time series of the values of the second metric.

19. The non-transitory computer-readable media of claim 13, wherein the processor-executable instructions, when executed by the at least one processor, further cause the at least one processor to:
cause, based on input data via a second one or more control elements of the plurality of control elements, a menu of selectable source points corresponding to respective components of the DER to be displayed.

20. The non-transitory computer-readable media of claim 19, wherein the processor-executable instructions, when executed by the at least one processor, further cause the at least one processor to:
update, based on an interrupt signal indicative of a selection of a first selectable source point in the menu of selectable source points, a graph of a temporal dependence of a second portion of the operational data, wherein the second portion of the operational data comprises values associated with a metric that quantifies operation of a component of the respective components of the DER.

21. The non-transitory computer-readable media of claim 13, wherein the processor-executable instructions, when executed by the at least one processor, further cause the at least one processor to cause, based on configuring the at least one attribute, the UI to display a visual representation of the DER.

22. The non-transitory computer-readable media of claim 13, wherein the graph comprises one or more visual elements indicative of a time series of the values of the metric.

23. The non-transitory computer-readable media of claim 13, wherein the plurality of areas further comprises a fourth area of the plurality of areas comprising first text that identifies an alarm and second text indicating that the alarm is in a normal state or an abnormal state.

* * * * *